United States Patent
Pham

(10) Patent No.: US 9,466,113 B2
(45) Date of Patent: Oct. 11, 2016

(54) POST-PROCESSED BOKEH RENDERING USING ASYMMETRIC RECURSIVE GAUSSIAN FILTERS

(71) Applicant: CANON KABUSHIKI KAISHA, Tokyo (JP)

(72) Inventor: Quang Tuan Pham, North Ryde (AU)

(73) Assignee: CANON KABUSHIKI KAISHA, Tokyo (JP)

( * ) Notice: Subject to any disclaimer, the term of this patent is extended or adjusted under 35 U.S.C. 154(b) by 119 days.

(21) Appl. No.: 14/574,280

(22) Filed: Dec. 17, 2014

(65) Prior Publication Data
US 2015/0178970 A1   Jun. 25, 2015

(30) Foreign Application Priority Data
Dec. 23, 2013   (AU) ................ 2013273830

(51) Int. Cl.
| | |
|---|---|
| *G06T 5/20* | (2006.01) |
| *G06T 7/00* | (2006.01) |
| *G06K 9/52* | (2006.01) |
| *G06T 5/00* | (2006.01) |
| *G06K 9/62* | (2006.01) |

(52) U.S. Cl.
CPC ............. *G06T 7/0051* (2013.01); *G06K 9/52* (2013.01); *G06K 9/6256* (2013.01); *G06T 5/002* (2013.01); *G06T 5/20* (2013.01); *G06T 2207/10028* (2013.01); *G06T 2207/30201* (2013.01)

(58) Field of Classification Search
None
See application file for complete search history.

(56) References Cited

U.S. PATENT DOCUMENTS
| | | |
|---|---|---|
| 7,787,688 B1 | 8/2010 | Kass |
| 7,885,454 B1 | 2/2011 | Kass |
| 8,244,029 B1 | 8/2012 | Kass |

OTHER PUBLICATIONS

Sungkil Lee et al., "Real-Time Depth-of-Field Rendering Using Anisotropically Filtered Mipmap Interpolation", IEEE Transactions on Visualization and Computer Graphics, vol. 15, No. 3, May/Jun. 2009, pp. 453-464.*
M. Kass; A. Lefohn; J. Owens; Technical Report #06-01, Pixar Animation Studios, Jan. 2006, Interactive Depth of Field Using Simulated Diffusion on a GPU, pp. 1-8.
Sovira Tan; Jason L. Dale; Alan Johnston; Performance of three recursive algorithms for fast space-variant Gaussian filtering, Real-Time Imaging Sep. 2003, 9, pp. 215-228.

* cited by examiner

*Primary Examiner* — Brian P Werner
(74) *Attorney, Agent, or Firm* — Canon USA, INC. IP Division

(57) ABSTRACT

A method of blurring an image using a spatially variable blur is disclosed. The method comprises the steps of: for each pixel of a scan line of pixels in the image: obtaining a measure representative of image depth at the pixel; determining a blur kernel width for the pixel based on the measure representative of image depth at the pixel; and where an increase in the determined blur kernel width with respect to a blur kernel width of a previous pixel in the scan line is detected: determining, from the determined blur kernel width, a tapered blur width adapted to provide an asymmetric filter response for the pixel; and applying the tapered blur width to a filter to output a blurred pixel value for the pixel by using a plurality of filter coefficients determined based on blur width values of one or more previously blurred pixels.

20 Claims, 14 Drawing Sheets

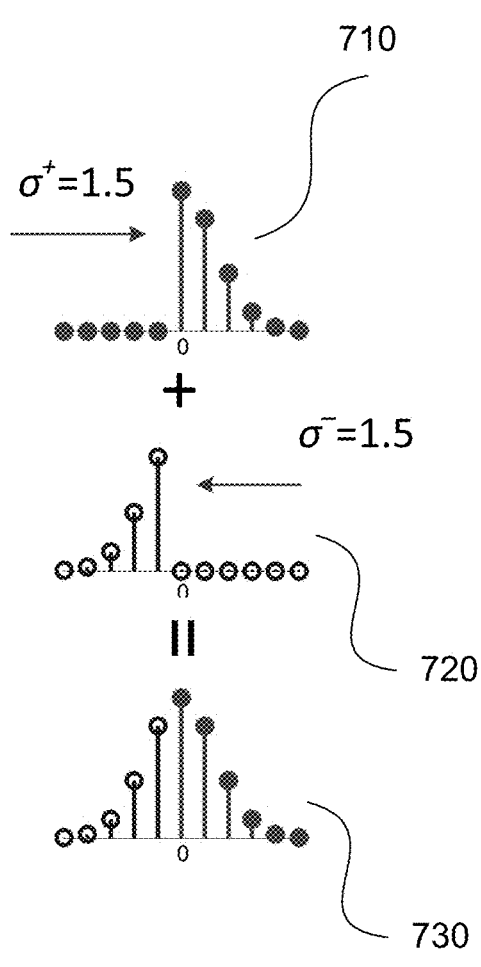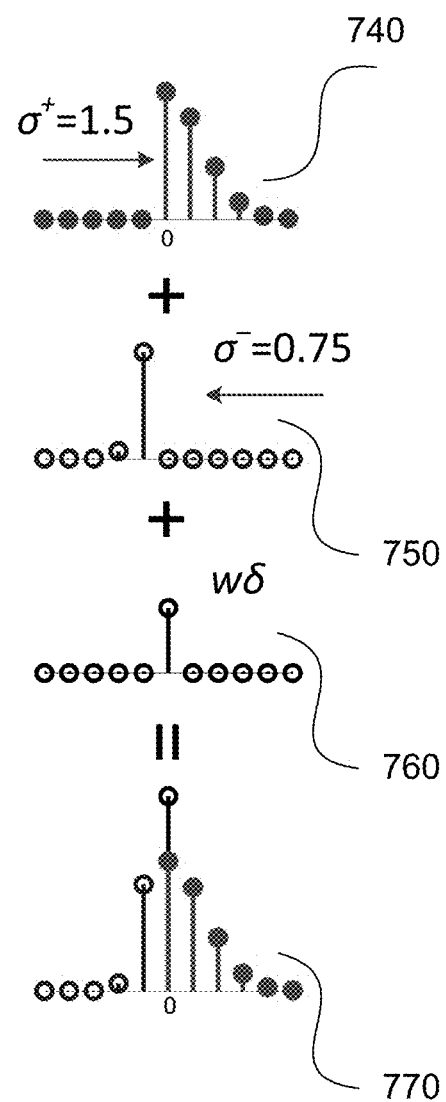
Fig. 7A
Fig. 7B $1/(1+(gm/k)^2)$

POST-PROCESSED BOKEH RENDERING USING ASYMMETRIC RECURSIVE GAUSSIAN FILTERS

REFERENCE TO RELATED PATENT APPLICATION(S)

This application claims the benefit under 35 U.S.C. §119 of the filing date of Australian Patent Application No. 2013273830, filed Dec. 23, 2013, hereby incorporated by reference in its entirety as if fully set forth herein.

TECHNICAL FIELD

The present invention relates to digital image processing and, in particular, to rendering photographic images with modified blur characteristics.

BACKGROUND

When taking a photograph, only part of the scene will be in-focus with objects closer to or further away from the camera appearing blurry in the captured image. The degree of blurring increases with increasing distance from the in-focus region. The distance between the closest and most distant objects in a scene that appear acceptably sharp is known as the depth of field (DOF). In some photographic situations, such as for portraits, it is highly desirable to have a narrow DOF as the resulting bluffed background removes distractions and directs the viewer's attention to the in-focus subject.

Images captured by SLR (single-lens reflex) cameras generally have the desirable characteristic of a narrow DOF. The subject of focus possesses maximum sharpness whereas the background, usually at a different depth to the camera, appears blurred. The visually pleasing background blur, also known as bokeh, is only achievable optically under large apertures. As a result, images from low-cost compact cameras often appear sharp everywhere. This extended depth of field effect typically reduces the perceived quality of images captured with a compact camera, when compared with a SLR camera.

Higher quality cameras, such as SLR models, are generally able to capture images with a narrow depth of field due to the large size of the lens and sensor. The large lens advantageously enables a correspondingly large aperture to be selected to create the desired depth of field effect. Notwithstanding, due to factors such as reduced cost and size, compact cameras are more popular than SLR cameras. Disadvantageously, though, photographs taken with compact cameras inherently have a greater DOF than images taken using an SLR camera with the same field of view and relative aperture due to optical constraints. One approach to producing SLR-like images in a compact camera is to post-process the captured image in conjunction with a depth map of the scene to reduce the apparent DOF. This is termed bokeh rendering or depth-of-field rendering. The depth map is used to selectively blur background pixels, leaving substantially only the subject in-focus.

Numerous techniques have been developed to obtain a depth map of a scene. These are classified as active (projecting light or other energy on to the scene) or passive (relying only on ambient light). Active methods, such as structured light, are often expensive, require additional power, may be intrusive and do not function outside a specified range of depth. Passive depth mapping methods, such as depth from defocus or depth from stereo, are less expensive but are also less accurate for natural scenes. For example, passive mapping techniques are generally unable to obtain depth information for surfaces with low texture contrast, which leads to errors in the depth map. Fortunately, these errors can be reduced by analysing the original image and enforcing correspondence between object edges and depth boundaries to produce a refined depth map. Human annotation is sometimes used to manually segment an image or to correct for segmentation errors from computational depth mapping techniques. In computer generated graphics, an accurate depth map is available together with three-dimensional (3D) scene information.

There are numerous known methods for bokeh rendering. Many of the earlier such methods originated from the field of computer graphics, where full 3D information of the scene is available. Rendering from multiple pin-hole cameras, for example, approximates the effect of imaging with a finite aperture lens by placing the pin-hole cameras at different locations throughout the lens. Ray tracing renders depth of field by casting multiple rays across the lens. Both of these methods provide realistic rendering if the number of pin-hole cameras or light rays is large enough to properly sample the point spread function of the most blurred pixels. However, due to this large number of pin-hole cameras or light rays required, these methods are not generally suitable for real-time operation, even when practised in a parallel processing environment.

When concerned with real-time operation, post-processing an image captured by or rendered from a pinhole camera is a preferred approach over ray tracing. In this approach each pixel is blurred by a different amount derived from its depth. There are two ways to achieve this space-variant blur: spreading and gathering. In spreading, the point spread function of each input pixel is splatted onto the output image. In gathering, the intensity of each output pixel is a linear combination of the intensities of the surrounding input pixels. The weights of this linear combination form a filter kernel centred at the output pixel. Both spreading and gathering can make use of depth ordering (e.g., using a z-buffer) to avoid blurry background pixels affecting sharp pixels in front of them or vice versa. Although spreading is a better approximation of the image formation process, it is more expensive to implement than gathering. Specifically, spreading needs substantially more write access than gathering. Spreading writes to all neighbouring pixels of each input pixel it visits. Gathering, on the other hand, needs only one write access per output pixel.

Gathering can be seen as a convolution of the input image with a filter kernel. The size and shape of the filter directly correspond to the amount of blur applied to the input image at any given point. This type of filtering has a Finite Impulse Response (FIR), which is a sampled version of the filter itself. The computational complexity of FIR filters is therefore proportional to the size of the filter. While suitable for small filters, FIR filtering is often too costly for large filters. Large FIR filters can be implemented more efficiently as a product in the Fourier domain, however this creates a fixed amount of blur for each Fourier operation and is therefore unsuitable for creating variable blur.

Fortunately, there is a more efficient way of image filtering whose complexity is independent of the filter size. Infinite Impulse Response (IIR) filters achieve this goal using a fixed number of filtering taps by feeding previously filtered output pixels to the filtering of the current pixel. Traditional IIR filters can be used to synthesize bokeh by changing the filter parameters according to the varying blur width at each pixel. However, this naïve extension of traditional IIR filters to handle variable blur width often results in bleeding artefacts across sharp depth discontinuities.

Instead of outputting a blurred pixel value in one step using a filter kernel, the output pixel can be iteratively blurred through a diffusion process. Analogous to heat diffusion over a conducting medium, diffusion can be applied to an image to achieve a Gaussian-like blur. At each iteration, the image I is blurred by a small incremental amount by adding a fraction of its $$\text{Laplacian } \Delta I = \frac{\partial^2 I}{\partial x^2} + \frac{\partial^2 I}{\partial y^2}.$$

The fraction, also known as the step size, is typically small (e.g., less than 0.25) for the diffusion process to be stable. The final output image has a desired amount of blur after a certain number of iterations. To achieve space-variant blur, the step size can be varied locally across the image in similar fashion to varying the heat conductivity of the medium. In the in-focus midground, for example, the conductivity or diffusivity should be close to zero to incur minimal blur. In the blurred background and blurred foreground regions, the diffusivity should be set to a high value (not too high to avoid instability, i.e., less than 1) for maximum diffusion per iteration. Diffusion methods do not produce bleeding artefacts if setup correctly because the blurring is stopped at depth discontinuities. However, diffusion is not suitable for hardware implementation due to its iterative traverse over the image data. Methods that aim to solve the edge-stopping diffusion equation directly result in a large linear system involving all input pixels and all output pixels. Although this sparse linear system can be solved recursively using LU decomposition, the computational cost is still high and graphical processing units have to be employed to achieve interactive speed (i.e., close to real-time).

Another approach to bokeh rendering that is gaining popularity recently is a layer compositing approach. In this approach, the image is segmented into different layers based on depth. Each layer gets blurred separately and the blurred results are then combined to form the final output. The combination usually involves some form of alpha-matting for a smooth transition across layers. A straightforward way of segmenting the image into different layers is by depth discretisation. Each layer contains pixels from a narrow range of depth and therefore can be blurred by a single filter kernel or more efficiently in the Fourier domain. Depth discretisation, however, results in discretisation artefacts at layer boundaries. This type of artefact is most visible when an object of extended depth range is split into different layers. A better way to segment the image is to split the pixels into either two layers (sharp foreground against blurred background) or three layers (blurred foreground, sharp midground, and blurred background). Separation of the blurred foreground layer from the sharp midground layer makes it easier to simulate a partial occlusion effect. The blurred background behind a thin midground object also appears more natural with this layering approach. However, due to the coarse depth segmentation, each layer may still need to be blurred by a space-variant filter.

None of the above-mentioned methods offer a combination of real-time and high-quality bokeh rendering without artefacts. Hence, there is a need for an improved bokeh rendering method and system that is efficient and hardware-friendly and that can simulate realistic blur given a continuous space-variant depth map.

SUMMARY

It is an object of the present invention to substantially overcome, or at least ameliorate, one or more disadvantages of existing arrangements.

An aspect of the present invention provides a method of blurring an image using a spatially variable blur. The method comprises the steps of: for each pixel of a scan line of pixels in the image: obtaining a measure representative of image depth at the pixel; determining a blur kernel width for the pixel based on the measure representative of image depth at the pixel; and where an increase in the determined blur kernel width with respect to a blur kernel width of a previous pixel in the scan line is detected: determining, from the determined blur kernel width, a tapered blur width adapted to provide an asymmetric filter response for the pixel; and applying the tapered blur width to a filter to output a bluffed pixel value for the pixel by using a plurality of filter coefficients determined based on blur width value of one or more previously blurred pixels.

Another aspect of the present invention provides a computer system for bluffing an image using a spatially variable blur. The computer system comprises: a memory unit for storing data and instructions; and at least one processing unit coupled to the memory unit. The at least one processing unit is programmed to: for each pixel of a scan line of pixels in the image: obtain a measure representative of image depth at the pixel; determine a blur kernel width for the pixel based on the measure representative of image depth at the pixel; and where an increase in the determined blur kernel width with respect to a blur kernel width of a previous pixel in the scan line is detected: determine, from the determined blur kernel width, a tapered blur width adapted to provide an asymmetric filter response for the pixel; and apply the tapered blur width to a filter to output a bluffed pixel value for the pixel by using a plurality of filter coefficients determined based on blur width value of one or more previously blurred pixels.

Another aspect of the present invention provides a computer program product having a non-transitory computer program stored thereon for blurring an image using a spatially variable blur. The computer program comprises code for processing scan lines of pixels in the image and for each pixel in a scan line: obtaining a measure representative of image depth at the pixel; determining a blur kernel width for the pixel based on said measure representative of image depth at the pixel; and where an increase in the determined blur kernel width with respect to a blur kernel width of a previous pixel in the scan line is detected: determining, from the determined blur kernel width, a tapered blur width adapted to provide an asymmetric filter response for the pixel; and applying the tapered blur width to a filter to output a blurred pixel value for the pixel by using a plurality of filter coefficients determined based on blur width value of one or more previously blurred pixels.

In each of the foregoing aspects of the present invention:

The blurred pixel value may comprise a weighted average of an initial pixel value of the pixel, and an initial value and a blurred value of a previously blurred pixel on the scan line.

The tapered blur width may be modified from the blur kernel width to limit the rate of increase of the tapered blur width to a maximum of one third per pixel.

The tapered blur width may be modified from the blur kernel width by adding an intensity-dependent offset.

The tapered blur width at a current pixel on the scan line may be determined recursively based on the tapered blur width at a previous pixel on the scan line and the blur kernel width at the current pixel.

The plurality of filter coefficients may be retrieved from a look-up table for each value of the associated tapered blur width.

The spatially variable blur may be applied separably along a horizontal scan line followed by a vertical scan line or may be applied separably along a vertical scan line followed by a horizontal scan line.

The spatially variable blur may be applied on an inverse tone-mapped image, the result of which is tone-mapped back using a forward tone mapping.

The spatially variable blur may be applied on different segmentation layers of an input image and the results of each layer may be blended together to form an output image.

The measure representative of image depth may comprise a gradient measure at the pixel. The gradient measure may be determined from a guide image.

BRIEF DESCRIPTION OF THE DRAWINGS

A small number of embodiments of the present invention are described hereinafter with reference to the following drawings, in which:

FIG. 7A illustrates the formation of a symmetric 1D filter response from the summation of a causal filter response and an anti-causal filter response using the same directional blur width in accordance with an embodiment of the present invention;

FIG. 7B illustrates the formation of an asymmetric 1D filter response from the summation of a causal filter response with one directional blur width, an anti-causal filter response with a different directional blur width, and a weighted impulse response in accordance with an embodiment of the present invention;

DETAILED DESCRIPTION INCLUDING BEST MODE

Figure 1A:
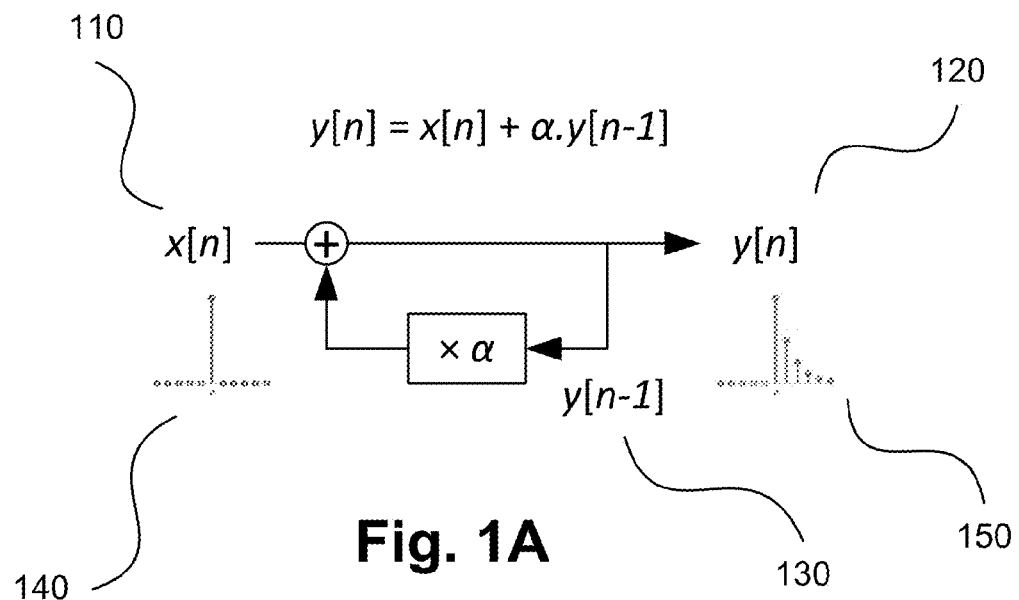
FIG. 1A is a schematic block and flow diagram illustrating recursive filtering in the discrete time domain in one dimension (1D)

Where reference is made in any one or more of the accompanying drawings to steps and/or features, which have the same reference numerals, those steps and/or features have for the purposes of this description the same or substantially similar function(s) or operation(s), unless the contrary intention appears.

It is to be noted that the foregoing discussions contained in the "Background" section and that above relating to prior art or known arrangements relate to documents or devices which form public knowledge through their respective publication and/or use. Such should not be interpreted as a representation by the present inventor(s) or the patent applicant that such documents or devices in any way form part of the common general knowledge in the art.

Context

An automated method of generating artificial bokeh from an extended depth-of-field image and an associated depth map using an edge-stopping recursive Gaussian filter is disclosed herein. Recursive or IIR Gaussian filtering is chosen for the post-processing because it can efficiently apply a variable amount of blur to different areas in the image. To achieve a realistic bokeh, one needs to have depth information at every pixel and convert this depth to a blur width. The depth information can be obtained from a co-located depth sensor, or it can be estimated from the captured images using computational techniques such as depth from defocus.

Given a depth map and a desired focal distance, a blur value can be derived for each pixel in the image. Image regions whose depth is around the focal distance will have a close-to-zero blur value. These in-focus regions are also called the midground. Image regions at a closer depth than the midground, which are known as the foreground, will be out-of-focus and therefore have a relatively large blur value. Similarly, image regions at a further depth than the midground, which are known as the background, will also have a relatively large blur value. Both the foreground and the background appear blurry. However, while the out-of-focus background is occluded by the in-focus midground, the foreground appears floating in front of the midground. If the foreground blur is significant, the foreground objects may appear semi-transparent on top of the sharp midground. The midground is then said to be partially occluded by the blurry foreground.

The shape and intensity of the image formed on a camera sensor by a point source of light in a scene is known as the point spread function (PSF). For a circular lens aperture, the PSF will take the form of a disc, which is also known as circle of confusion (CoC). Using a thin lens, ray-based optical model for image capture, the relationship between the blur (PSF) diameter c (measured at the sensor), and a depth Z, is given by the following equation:

$$c = A \frac{|Z| - |S_2|}{Z} \cdot \frac{f}{S_2 - f}. \quad (1)$$

where
c is the blur disc diameter,
A is the aperture diameter,
f is the focal length of the lens,
Z is the distance between the lens and the layer containing the scene object centred at a current pixel location, and
$S_2$ is the distance between the lens and the scene focal plane (all having the same distance unit such as millimeters).

The increase in blur for bokeh rendering may be controlled by selecting an appropriate aperture value A for the simulated optical system.

When performing post-processing bokeh rendering using Gaussian filters, the circle of confusion is approximated by a Gaussian function. The scale of the Gaussian PSF blur or the blur width σ is proportional to the theoretical CoC diameter in equation (1). Instead of being measured in millimeters, the blur width σ is often given in terms of pixels for ease of implementation. Gaussian PSF results in smooth bokeh, which resembles the perceptual blur in peripheral vision of the human eye.

Figure 4A:
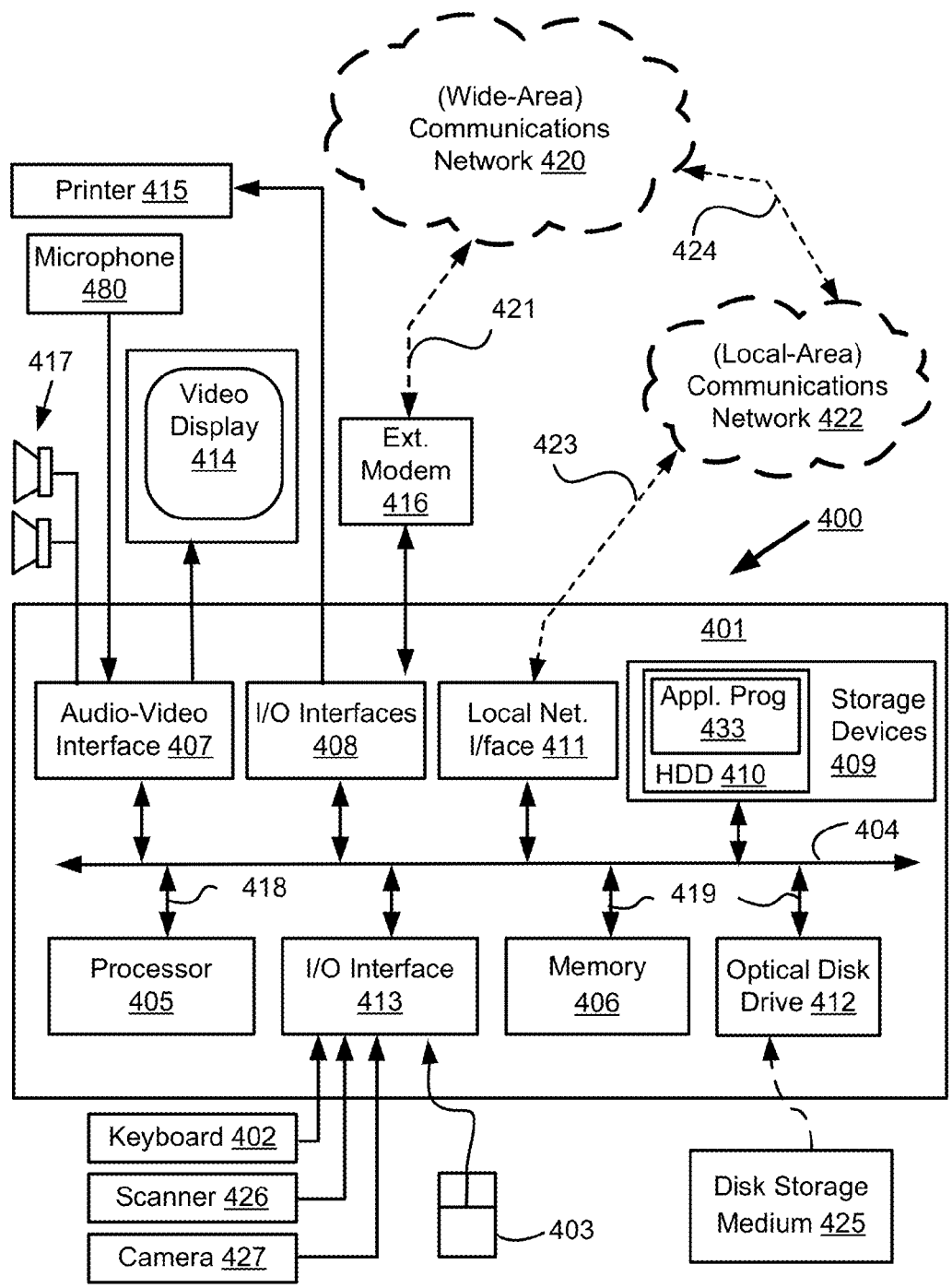
FIGS. 4A and 4B constitute a schematic block diagram of a general purpose computer with which the bokeh generating and/or rendering embodiments and/or arrangements described herein may be practised.
Figure 4B:
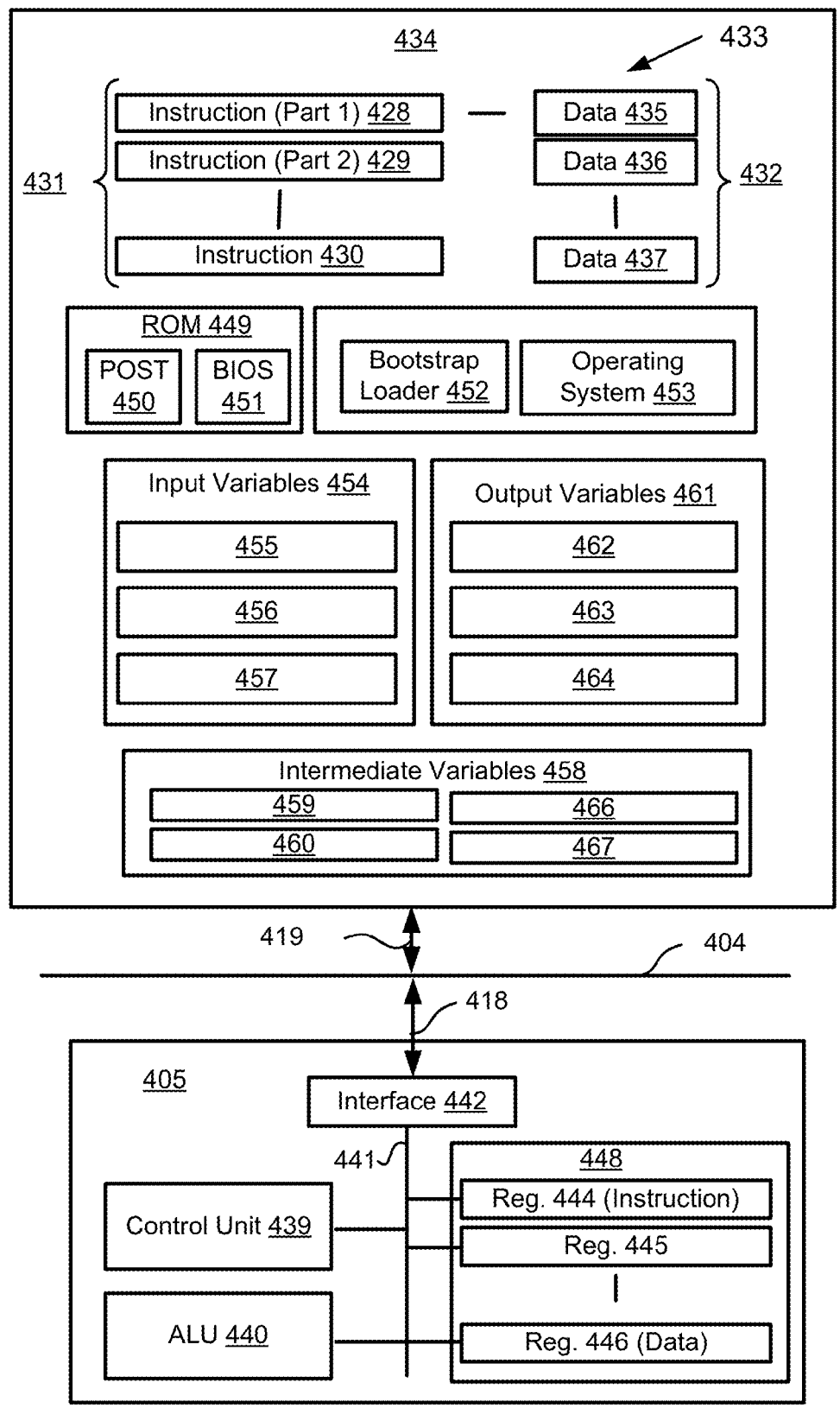

FIGS. 4A and 4B depict a general-purpose computer system 400, with which the various bokeh rendering embodiments or arrangements described herein can be practiced.

As seen in FIG. 4A, the computer system 400 includes: a computer module 401; input devices such as a keyboard 402, a mouse pointer device 403, a scanner 426, a camera 427, and a microphone 480; and output devices including a printer 415, a display device 414 and loudspeakers 417. An external Modulator-Demodulator (Modem) transceiver device 416 may be used by the computer module 401 for communicating to and from a communications network 420 via a connection 421. The communications network 420 may be a wide-area network (WAN), such as the Internet, a cellular telecommunications network, or a private WAN. Where the connection 421 is a telephone line, the modem 416 may be a traditional "dial-up" modem. Alternatively, where the connection 421 is a high capacity (e.g., cable) connection, the modem 416 may be a broadband modem. A wireless modem may also be used for wireless connection to the communications network 420.

The computer module 401 typically includes at least one processor unit 405, and a memory unit 406. For example, the memory unit 406 may have semiconductor random access memory (RAM) and semiconductor read only memory (ROM). The computer module 401 also includes an number of input/output (I/O) interfaces including: an audio-video interface 407 that couples to the video display 414, loudspeakers 417 and microphone 480; an I/O interface 413 that couples to the keyboard 402, mouse 403, scanner 426, camera 427 and optionally a joystick or other human interface device (not illustrated); and an interface 408 for the external modem 416 and printer 415. In some implementations, the modem 416 may be incorporated within the computer module 401, for example within the interface 408. The computer module 401 also has a local network interface 411, which permits coupling of the computer system 400 via a connection 423 to a local-area communications network 422, known as a Local Area Network (LAN). As illustrated in FIG. 4A, the local communications network 422 may also couple to the wide network 420 via a connection 424, which would typically include a so-called "firewall" device or device of similar functionality. The local network interface 411 may comprise an Ethernet circuit card, a Bluetooth® wireless arrangement or an IEEE 802.11 wireless arrangement; however, numerous other types of interfaces may be practiced for the interface 411.

The I/O interfaces 408 and 413 may afford either or both of serial and parallel connectivity, the former typically being implemented according to the Universal Serial Bus (USB) standards and having corresponding USB connectors (not illustrated). Storage devices 409 are provided and typically include a hard disk drive (HDD) 410. Other storage devices such as a floppy disk drive and a magnetic tape drive (not illustrated) may also be used. An optical disk drive 412 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the system 400.

The components 405 to 413 of the computer module 401 typically communicate via an interconnected bus 404 and in a manner that results in a conventional mode of operation of the computer system 400 known to those in the relevant art. For example, the processor 405 is coupled to the system bus 404 using a connection 418. Likewise, the memory 406 and optical disk drive 412 are coupled to the system bus 404 by connections 419. Examples of computers on which the described arrangements can be practised include IBM-PC's and compatibles, Sun Sparcstations, Apple Mac™ or a like computer systems.

The bokeh rendering methods or processes described herein may be implemented using the computer system 400 wherein the methods or processes described hereinafter with reference to FIGS. 9, 10, 11 and 12 may be implemented as one or more software application programs 433 executable within the computer system 400. In particular, the steps of the bokeh rendering methods or processes described herein are effected by instructions 431 (see FIG. 4B) in the software 433 that are carried out within the computer system 400. The software instructions 431 may be formed as one or more code modules, each for performing one or more particular tasks. The software may also be divided into two separate parts, in which a first part and the corresponding code modules performs the bokeh rendering methods or processes described herein and a second part and the corresponding code modules manage a user interface between the first part and the user.

The software may be stored in a computer readable medium, including the storage devices described below, for example. The software is loaded into the computer system 400 from the computer readable medium, and then executed by the computer system 400. A computer readable medium having such software or computer program recorded on the computer readable medium is a computer program product. The use of the computer program product in the computer system 400 preferably effects an advantageous bokeh rendering apparatus.

The software 433 is typically stored in the HDD 410 or the memory 406. The software is loaded into the computer system 400 from a computer readable medium, and executed by the computer system 400. Thus, for example, the software 433 may be stored on an optically readable disk storage medium (e.g., CD-ROM) 425 that is read by the optical disk drive 412. A computer readable medium having such software or computer program recorded on it is a computer program product. The use of the computer program product in the computer system 400 preferably effects an apparatus for performing the bokeh rendering methods or processes described herein.

In some instances, the application programs 433 may be supplied to the user encoded on one or more CD-ROMs 425 and read via the corresponding drive 412, or alternatively may be read by the user from the networks 420 or 422. Still further, the software can also be loaded into the computer system 400 from other computer readable media. Computer readable storage media refers to any non-transitory tangible storage medium that provides recorded instructions and/or data to the computer system 400 for execution and/or processing. Examples of such storage media include floppy disks, magnetic tape, CD-ROM, DVD, Blu-ray Disc™, a hard disk drive, a ROM or integrated circuit, USB memory, a magneto-optical disk, or a computer readable card such as a PCMCIA card and the like, whether or not such devices are internal or external of the computer module 401. Examples of transitory or non-tangible computer readable transmission media that may also participate in the provision of software, application programs, instructions and/or data to the computer module 401 include radio or infra-red transmission channels as well as a network connection to another computer or networked device, and the Internet or Intranets including e-mail transmissions and information recorded on Websites and the like.

The second part of the application programs 433 and the corresponding code modules mentioned above may be executed to implement one or more graphical user interfaces (GUIs) to be rendered or otherwise represented upon the display 414. Through manipulation of typically the keyboard 402 and the mouse 403, a user of the computer system 400 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 417 and user voice commands input via the microphone 480.

FIG. 4B is a detailed schematic block diagram of the processor 405 and a "memory" 434. The memory 434 represents a logical aggregation of all the memory modules (including the HDD 409 and semiconductor memory 406) that can be accessed by the computer module 401 in FIG. 4A.

When the computer module 401 is initially powered up, a power-on self-test (POST) program 450 executes. The POST program 450 is typically stored in a ROM 449 of the semiconductor memory 406 of FIG. 4A. A hardware device such as the ROM 449 storing software is sometimes referred to as firmware. The POST program 450 examines hardware within the computer module 401 to ensure proper functioning and typically checks the processor 405, the memory 434 (409, 406), and a basic input-output systems software (BIOS) module 451, also typically stored in the ROM 449, for correct operation. Once the POST program 450 has run successfully, the BIOS 451 activates the hard disk drive 410 of FIG. 4A. Activation of the hard disk drive 410 causes a bootstrap loader program 452 that is resident on the hard disk drive 410 to execute via the processor 405. This loads an operating system 453 into the RAM memory 406, upon which the operating system 453 commences operation. The operating system 453 is a system level application, executable by the processor 405, to fulfil various high level functions, including processor management, memory management, device management, storage management, software application interface, and generic user interface.

The operating system 453 manages the memory 434 (409, 406) to ensure that each process or application running on the computer module 401 has sufficient memory in which to execute without colliding with memory allocated to another process. Furthermore, the different types of memory available in the system 400 of FIG. 4A must be used properly so that each process can run effectively. Accordingly, the aggregated memory 434 is not intended to illustrate how particular segments of memory are allocated (unless otherwise stated), but rather to provide a general view of the memory accessible by the computer system 400 and how such is used.

As shown in FIG. 4B, the processor 405 includes a number of functional modules including a control unit 439, an arithmetic logic unit (ALU) 440, and a local or internal memory 448, sometimes called a cache memory. The cache memory 448 typically includes a number of storage registers 444-446 in a register section. One or more internal busses 441 functionally interconnect these functional modules. The processor 405 typically also has one or more interfaces 442 for communicating with external devices via the system bus 404, using a connection 418. The memory 434 is coupled to the bus 404 using a connection 419.

The application program 433 includes a sequence of instructions 431 that may include conditional branch and loop instructions. The program 433 may also include data 432 which is used in execution of the program 433. The instructions 431 and the data 432 are stored in memory locations 428, 429, 430 and 435, 436, 437, respectively. Depending upon the relative size of the instructions 431 and the memory locations 428-430, a particular instruction may be stored in a single memory location as depicted by the instruction shown in the memory location 430. Alternately, an instruction may be segmented into a number of parts each of which is stored in a separate memory location, as depicted by the instruction segments shown in the memory locations 428 and 429.

In general, the processor 405 is given a set of instructions which are executed therein. The processor 1105 waits for a subsequent input, to which the processor 405 reacts to by executing another set of instructions. Each input may be provided from one or more of a number of sources, including data generated by one or more of the input devices 402, 403, data received from an external source across one of the networks 420, 402, data retrieved from one of the storage devices 406, 409 or data retrieved from a storage medium 425 inserted into the corresponding reader 412, all depicted in FIG. 4A. The execution of a set of the instructions may in some cases result in output of data. Execution may also involve storing data or variables to the memory 434.

The bokeh rendering methods or processes described herein use input variables 454, which are stored in the memory 434 in corresponding memory locations 455, 456, 457. The bokeh rendering methods or processes described herein produce output variables 461, which are stored in the memory 434 in corresponding memory locations 462, 463, 464. Intermediate variables 458 may be stored in memory locations 459, 460, 466 and 467.

Referring to the processor 405 of FIG. 4B, the registers 444, 445, 446, the arithmetic logic unit (ALU) 440, and the control unit 439 work together to perform sequences of micro-operations needed to perform "fetch, decode, and execute" cycles for every instruction in the instruction set making up the program 433. Each fetch, decode, and execute cycle comprises:

(i) a fetch operation, which fetches or reads an instruction 431 from a memory location 428, 429, 430;
(ii) a decode operation in which the control unit 439 determines which instruction has been fetched; and
(iii) an execute operation in which the control unit 439 and/or the ALU 440 execute the instruction.

Thereafter, a further fetch, decode, and execute cycle for the next instruction may be executed. Similarly, a store cycle may be performed by which the control unit 439 stores or writes a value to a memory location 432.

Each step or sub-process in the methods or processes described herein is associated with one or more segments of the program 433 and is performed by the register section 444, 445, 447, the ALU 440, and the control unit 439 in the processor 405 working together to perform the fetch, decode, and execute cycles for every instruction in the instruction set for the noted segments of the program 433.

The bokeh rendering methods or processes described herein may alternatively be implemented in dedicated hardware such as one or more integrated circuits performing the bokeh rendering functions or sub functions. Such dedicated hardware may include graphic processors, digital signal processors, or one or more microprocessors and associated memories.

Figure 9:
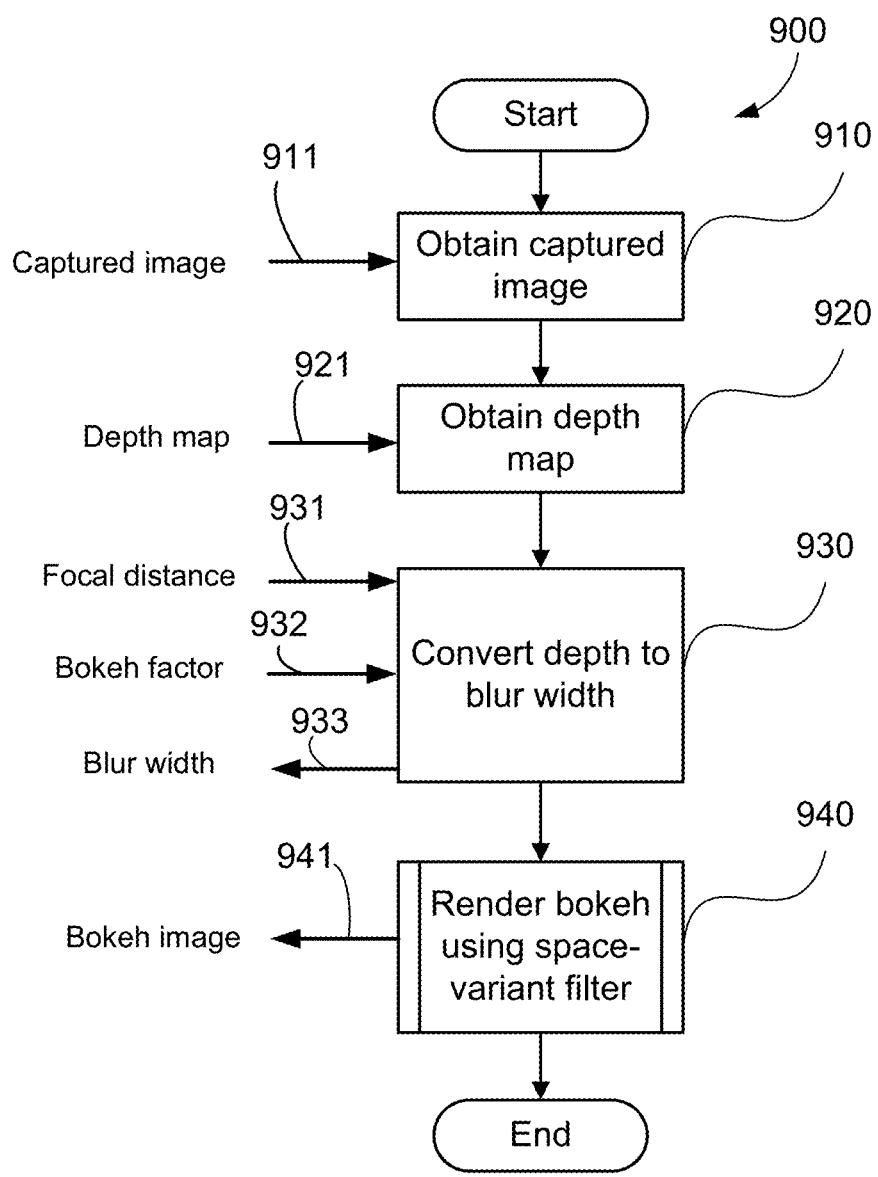
FIG. 9 is a schematic flow diagram of a method for post-processed bokeh rendering using a 2D space-variant filter in accordance with an embodiment of the present invention.

The schematic flow diagram of FIG. 9 shows the main steps of a method or process 900 for blurring an image using a spatially variable blur (i.e., artificial bokeh rendering). For convenience, the method or process 900 of FIG. 9 is described with reference to the computer system 400 of FIGS. 4A and 4B. However, those skilled in the art will appreciate that the method or process 900 may be practised using any other suitable computer system or hardware platform.

Referring to FIG. 9, a captured image 911 (also referred to as an input image) with an extended depth of field is obtained by the processor 405 as directed by the program 433, at step 910. A corresponding depth map 921 is obtained at a following step 920. The depth map $Z(x,y)$ comprises a depth measure for each pixel $(x,y)$ in the input image 911. The sharp edges in the depth map 921 correspond to object edges in the image 911. In other embodiments, the depth measure (i.e., measure representative of image depth at a pixel) may comprise a gradient measure derived from the input image or another related (guide) image. At a following step 930, performed by the processor 405 as directed by the program 433, blur width 933 is determined based on the depth measure for each pixel (e.g., the depth map 921 is mapped to a blur width 933). The blur width $\sigma(x,y)$ specifies the amount of blur to be applied at each pixel $(x,y)$ of the input image 911. Pixels whose depth is equal to a desired focal distance 931 have a zero blur width. The further away the depth of a pixel is from the focal plane at the focal distance $Z_0$ (or Petzval surface under optical aberration), the higher the blur width for that pixel. The blur width σ can be related back to the depth Z via the CoC diameter c in equation (1). Specifically, the blur width σ equals the CoC diameter c times a constant bokeh factor b, 932, (e.g. b=1):

$$\sigma = b \cdot c. \tag{2}$$

At a following step 940, performed by the processor 405 as directed by the program 433, the input image 911 is blurred using a spatially variable filter to form a bokeh image 941 and rendered (also referred to as a rendered image with a blurred background or an output image).

Details of the space-variant filter used in step 940, which is a recursive filter with an asymmetric Gaussian response about the filter centre, are provided hereinafter.

Infinite Impulse Response Filters

Two main types of filters are used in digital signal processing: Finite Impulse Response (FIR) and Infinite Impulse Response (IIR) filters. FIR filters are implemented as a weighted average of the input samples. The set of weights or filter coefficients forms the impulse response of the filter. Due to a finite number of filter coefficients, this type of filters has a finite impulse response. FIR filters are characterised by their filter coefficients. For examples, [0.25 0.5 0.25] is a 3-tap low-pass filter, and [−1 0 1] is a 3-tap central gradient filter.

Unlike FIR filters, IIR filters have a feedback component from a previously filtered output. FIG. 1A illustrates this concept in the discrete time domain, where the filter output y[n], 120, at a time instance n is a linear combination of the input sample x[n], 110, and a feedback component y[n−1], 130, from a previous time instance n−1:

$$y[n] = x[n] + \alpha \cdot y[n-1] \tag{3}$$

Figure 1B:
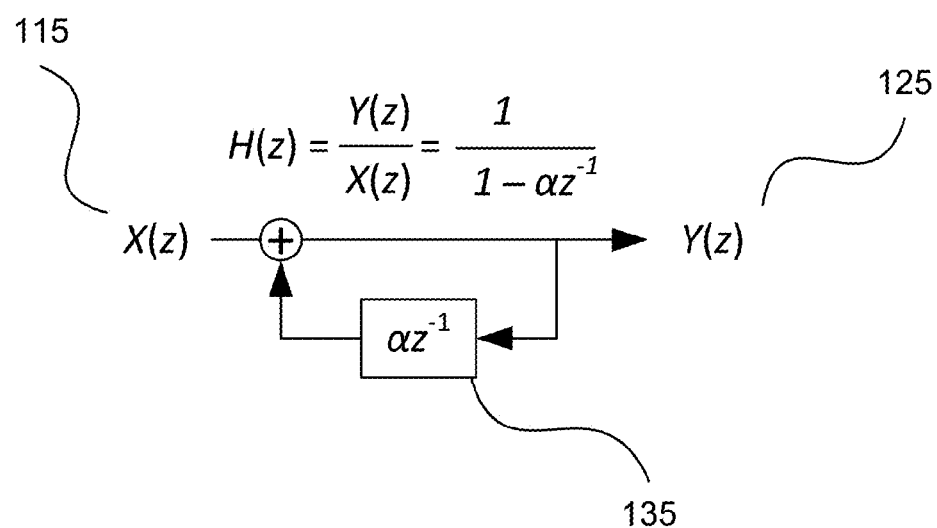
FIG. 1B is a schematic block and flow diagram illustrating recursive filtering in the Z-domain in 1D.

This IIR filter, which exhibits an exponential decay behaviour for $0 < \alpha < 1$, can also be characterised by its transfer function in the Z domain relating the input signal X(z), 115, and the output signal Y(z), 125, as illustrated in FIG. 1B:

$$H(z) = \frac{Y(z)}{X(z)} = \frac{1}{1 - \alpha z^{-1}} \tag{4}$$

The $z^{-1}$ block, 135, in FIG. 1B is a unit delay, which corresponds to the delayed feedback component $\alpha \cdot y[n-1]$ in the discrete time domain. Due to the feedback, the impulse response 150 of the IIR filter is infinite, that is given an impulse input 140, an infinite number of non-zero outputs will be output (see FIG. 1A). Because the impulse responses of IIR filters are not truncated, IIR filters have a substantially better frequency response than FIR filters given the same number of coefficients. Another advantage of IIR filters is that through recursion they use fewer taps to obtain an equivalent FIR filter of any filter size.

IIR filters are not without drawbacks, though. IIR filters cannot produce a filter response with a sudden fall off like a box filter. Separable IIR filters cannot produce non-separable response functions like a blur disc function. IIR filters can also be unstable. For example, the exponential filter in FIG. 1A shoots to infinity for $|\alpha| \geq 1$. The infinite impulse response can also result in unwanted signal bleeding over an extended duration.

Gaussian Filters from HR Filters

The IIR filter shown in FIG. 1A is a causal filter, that is, the filter output at time instance n depends only on the input samples at time instances before n. The impulse responses of such filters are zeros prior to the impulse. The impulse response of a Gaussian filter, on the other hand, is symmetric with non-zeros components on both sides of the central impulse. To achieve this symmetric impulse response, a combination of causal and anti-causal filters is often employed. Anti-causal filters are implemented similarly to causal filters, except that the input samples are processed in reverse order, starting from the last sample instance to the first sample instance.

Figure 2A:
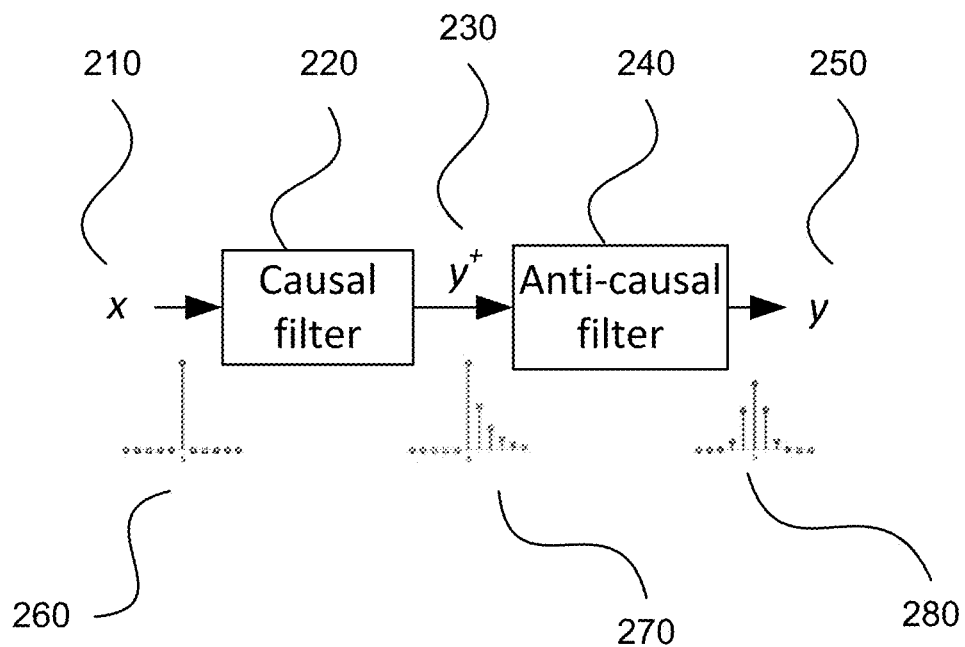
FIG. 2A is a schematic block and flow diagram of a sequential implementation of a symmetric 1D filter using a causal recursive filter and an anti-causal recursive filter.
Figure 2B:
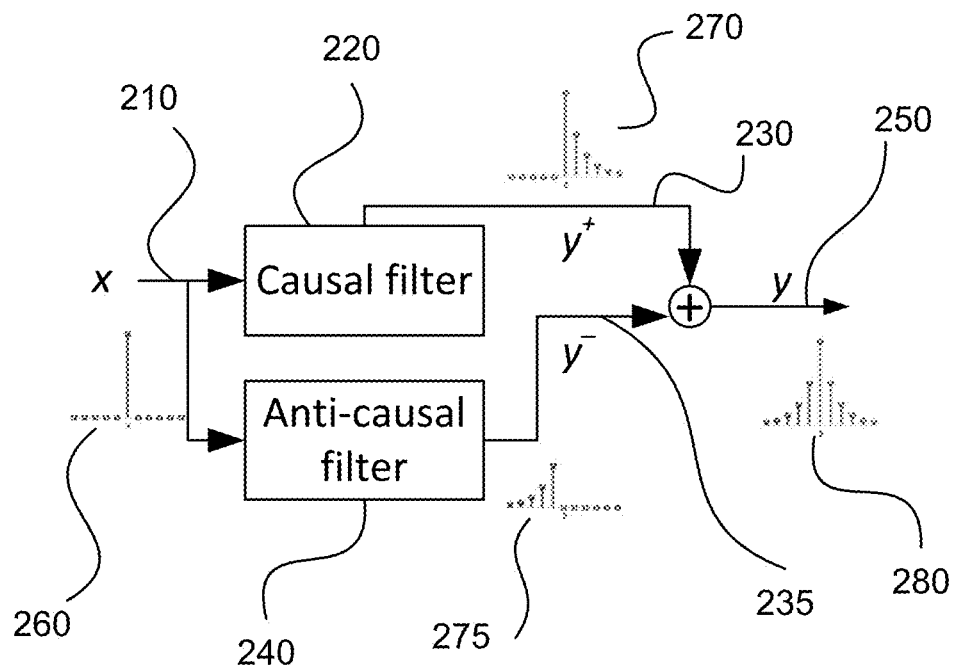
FIG. 2B is a schematic block and flow diagram of a parallel implementation of a symmetric 1D filter using a causal recursive filter and an anti-causal recursive filter.

Two ways to combine causal and anti-causal filters to produce a symmetric filter response are depicted in FIGS. 2A and 2B. The causal filter 220 and anti-causal filter 240 can be applied sequentially as in FIG. 2A or they can be applied in parallel followed by a summation as in FIG. 2B. In both the sequential and parallel implementations, the causal filter 220 is applied to the input signal x, 210, to produce a forward filtered output $y^+$, 230. In the sequential implementation, the forward filtered output $y^+$ is filtered again in the anti-causal direction to produce the final output y, 250. An example filter response is given for an impulse signal 260 in FIG. 2A, which results in a forward impulse response 270 and a combined impulse response 280. In the parallel implementation, the anti-causal filter 240 is applied to the input signal x, 210, to produce a backward filtered output $y^-$, 235. The forward filtered output $y^+$, 230, and the backward filtered output $y^-$, 235, are then added together to form the final output y, 250. The causal impulse response 270 and anti-causal impulse response 275 each form half of the total impulse response 280 in FIG. 2B. For reasons of convenience, embodiments of the present invention are generally described hereinafter with reference to the parallel implementation of the causal and anti-causal filters because it is easier to design the shape of the combined filter's impulse response from the shape of each constituent causal/anti-causal filter. However, those skilled in the art will appreciate that the sequential implementation of the causal and anti-causal filters may alternatively be practised.

Gaussian Filter from Second-Order IIR Filters

The Gaussian filter can be approximated using two independent passes of two second-order IIR filters. The impulse response of this approximated filter is:

$$S_\alpha(n) = k(\alpha|n| + 1)e^{-\alpha|n|} \quad (5)$$

where: $\alpha = 5/(2\sqrt{\pi}\sigma)$; and (6)

$$k = \frac{(1-e^{-\alpha})^2}{1 + 2\alpha e^{-\alpha} - e^{-2\alpha}}$$

This approximated Gaussian filter can be realised from a summation of a causal and an anti-causal IIR filter:

$$y_n^+ = n_0 x_n + n_1 x_{n-1} - d_1 y_{n-1}^+ - d_2 y_{n-2}^+ \forall n=-\infty, \ldots, \infty \quad (7)$$

$$y_n^- = m_1 x_{n+1} + m_2 x_{n+2} - d_1 y_{n+1}^- - d_2 y_{n+2}^- \forall n=\infty, \ldots, -\infty \quad (8)$$

$$y_n = y_n^+ + y_n^- \quad (9)$$

where:

$$n_0 = k \quad n_1 = ke^{-\alpha}(\alpha-1) \quad (10)$$

$$m_1 = ke^{-\alpha}(\alpha+1) \quad m_2 = -ke^{-2\alpha} \quad (11)$$

$$d_1 = 2e^{-\alpha} \quad d_2 = 2e^{2\alpha} \quad (12)$$

The filters from equations 7 and 8 are called second order recursive filters because the feedback delay is up to two samples before (or after) the current sample (n±2 versus n).

Note that although the pixel location n in equations 7 and 8 runs from $-\infty$ to $\infty$, the filtering actually takes place over the valid range of the image scan line (e.g., [0 image_width-1]). Out-of-bound pixels are assumed to take the intensities of the closest in-bound pixels (i.e., repeat border extension).

Gaussian Filter from Fourth-Order IIR Filters

The second-order recursive filter in equation 5 does not approximate the Gaussian function very well because of a small number of filter coefficients. By increasing the filter order to four, one can obtain a better approximation. The Gaussian function with a blur width $\sigma=1$ pixel can be approximated using the following trigonometric exponential function:

$$h(t) = \Sigma_{i=1}^{2}(a_i \cos \omega_i t + b_i \sin \omega_i t)e^{\lambda_i t}, t \geq 0 \quad (13)$$

The values of the parameters $a_i$, $b_i$, $\omega_i$, and $\lambda_i$ (i=1,2) obtained from non-linear optimisation are:

$$a_1 = 1.3530 \quad a_2 = -0.3531 \quad (14)$$

$$b_1 = 1.8151 \quad b_2 = 0.0902 \quad (15)$$

$$\omega_1 = 0.6681 \quad \omega_2 = 2.0787 \quad (16)$$

$$\lambda_1 = -1.3932 \quad \lambda_2 = -1.3732 \quad (17)$$

This results in fourth-order recursive filters in the causal and anti-causal directions:

$$y_n^+ = n_0 x_n + n_1 x_{n-1} + n_2 x_{n-2} + n_3 x_{n-3} - d_1 y_{n-1}^+ - d_2 y_{n-2}^+ - d_3 y_{n-3}^+ - d_4 y_{n-4}^+ \quad (18)$$

$$\forall n = -\infty, \ldots, \infty$$

$$y_n^- = m_1 x_{n+1} + m_2 x_{n+2} + m_3 x_{n+3} + m_4 x_{n+4} - d_1 y_{n+1}^- - d_2 y_{n+2}^- - d_3 y_{n+3}^- - d_4 y_{n+4}^- \quad (19)$$

$$\forall n = \infty, \ldots, -\infty$$

$$y_n = y_n^+ + y_n^- \quad (20)$$

where: the filter coefficients $n_j$, $m_j$, and $d_j$ (j=1 . . . 4) are derived from the function fit parameters $a_i$, $b_i$, $\omega_i$, and $\lambda_i$ (i=1,2) and the blur width $\sigma$:

$$n_0 = a_1 + a_2 \quad (21)$$

$$n_1 = e^{\frac{\lambda_2}{\sigma}}\left(b_2 \sin\frac{\omega_2}{\sigma} - (a_2 + 2a_1)\cos\frac{\omega_2}{\sigma}\right) + \quad (22)$$
$$e^{\frac{\lambda_1}{\sigma}}\left(b_1 \sin\frac{\omega_1}{\sigma} - (a_1 + 2a_2)\cos\frac{\omega_1}{\sigma}\right)$$

$$n_2 = 2e^{\frac{\lambda_1 + \lambda_2}{\sigma}}\left((a_1 + a_2)\cos\frac{\omega_2}{\sigma}\cos\frac{\omega_1}{\sigma} - b_1\cos\frac{\omega_2}{\sigma}\sin\frac{\omega_1}{\sigma} - b_2\cos\frac{\omega_1}{\sigma}\sin\frac{\omega_2}{\sigma}\right) + a_2 e^{\frac{2\lambda_1}{\sigma}} + a_1 e^{\frac{2\lambda_2}{\sigma}} \quad (23)$$

$$n_3 = e^{\frac{\lambda_2 + 2\lambda_1}{\sigma}}\left(b_2 \sin\frac{\omega_2}{\sigma} - a_2\cos\frac{\omega_2}{\sigma}\right) + e^{\frac{\lambda_1 + 2\lambda_2}{\sigma}}\left(b_1 \sin\frac{\omega_1}{\sigma} - a_1\cos\frac{\omega_1}{\sigma}\right) \quad (24)$$

$$d_1 = -2e^{\frac{\lambda_2}{\sigma}}\cos\frac{\omega_2}{\sigma} - 2e^{\frac{\lambda_1}{\sigma}}\cos\frac{\omega_1}{\sigma} \quad (25)$$

$$d_2 = 4e^{\frac{\lambda_1 + \lambda_2}{\sigma}}\cos\frac{\omega_2}{\sigma}\cos\frac{\omega_1}{\sigma} + 2e^{\frac{2\lambda_2}{\sigma}} + 2e^{\frac{2\lambda_1}{\sigma}} \quad (26)$$

$$d_3 = -2e^{\frac{\lambda_1 + 2\lambda_2}{\sigma}}\cos\frac{\omega_1}{\sigma} - 2e^{\frac{\lambda_2 + 2\lambda_1}{\sigma}}\cos\frac{\omega_2}{\sigma} \quad (27)$$

$$d_4 = e^{\frac{2(\lambda_1+\lambda_2)}{\sigma}} \quad (28)$$

$$m_i = n_i - d_i n_0, \, i = 1, 2, 3 \quad (29)$$

$$m_4 = d_4 n_0 \quad (30)$$

Separable Implementation for Optimal Cache Usage

Recursive approximations to the Gaussian filters are often designed in one-dimension (1D). When processing multi-dimensional (nD) images, the 1D IIR filters can be applied separably along each dimension because the Gaussian function is separable. A common way to do this is by first processing the input image in the row direction, followed by processing the output of the first step in the column direction. Because the image is often stored in memory and cache in a row-major order, row processing can be very efficient. Processing along the column direction, however, involves continual read/write access to multiple cache lines. This can result in frequent cache thrashing for large images, which slows down the processing. To prevent cache thrashing, the image is transposed after it has been filtered in the first dimension. Filtering the next dimension will therefore happen along the rows of the transposed image. This improves data cache usage for both write-through and write-back caches.

Figure 3A:
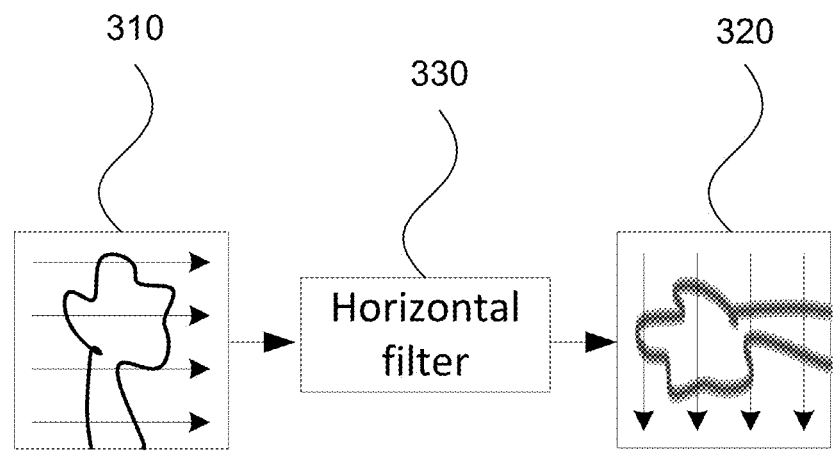
FIG. 3A illustrates an image transposing effect of a horizontal filter that writes filtered rows to columns of an intermediate output image.
Figure 3B:
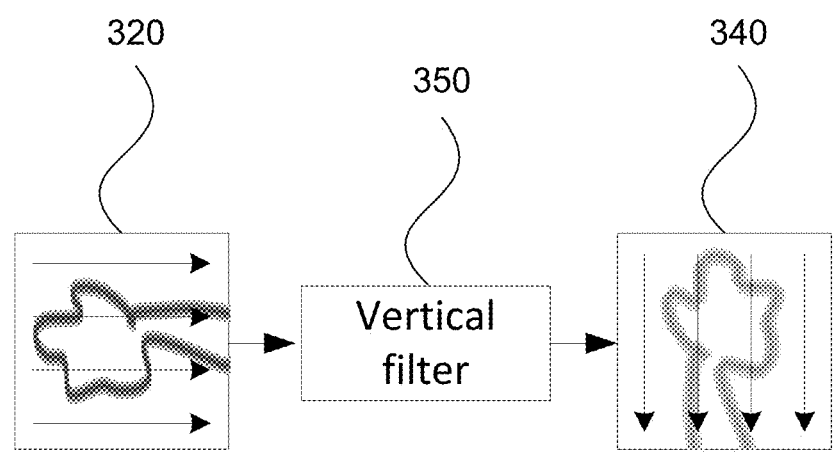
FIG. 3B illustrates an image re-transposing effect of a vertical filter that writes filtered rows of the intermediate output image of FIG. 3A to columns of a final output image.

The transpose solution for separable image filtering is illustrated in FIGS. 3A and 3B. A 2D input image 310 is first filtered along rows by a horizontal filter 330 in FIG. 3A. The horizontal filter 330 outputs the filtered rows along the columns of an intermediate image 320, effectively transposing the filtered image content. The intermediate image 320 is then filtered along its rows by a vertical filter 350 in FIG. 3B. The vertical filter outputs the filtered rows along the columns of an output image 340, effectively transposing back the filtered image content. After two separable filtering and transposing operations, the output image 340 is a bluffed version of the input image 310 along both directions.

Symmetric Space-Variant Recursive Gaussian Filter and its Bleeding Artefacts

Bokeh rendering frequently requires space-variant filtering, in which the blur width σ varies over the image. By treating the IIR filters' coefficients as variables of space, a recursive Gaussian filter can be applied in a space-variant fashion. Locally, this space-variant filter produces isotropic blur because the same σ is used for both the causal and anti-causal filters at each pixel. This symmetric space-variant Gaussian filtering is only suitable for slowly varying σ where the feedback samples y[n−i] (i=1,2, ... ) have been blurred with roughly the same blur width as the current output sample y[n]. Around regions of sharp blur width discontinuities, symmetric space-variant Gaussian filters produce artefacts because the blur widths are different on either side of the pixel. The artefacts result from intensity bleeding from the sharper side into the blurrier side of the edge.

Figure 5A:
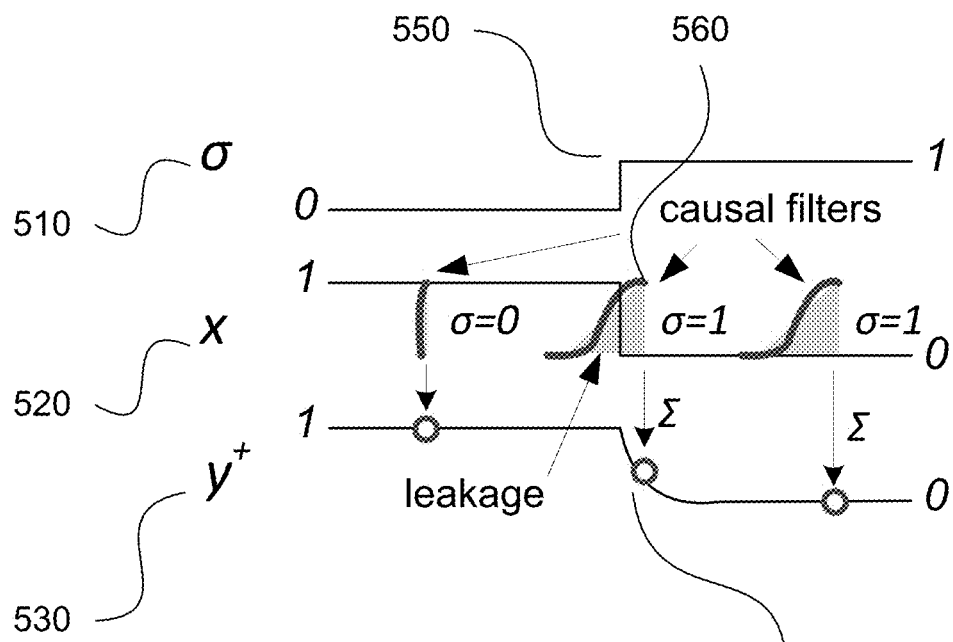
FIG. 5A is a diagram illustrating intensity leakage caused by a recursive filter in the causal direction around a rising blur discontinuity.
Figure 5B:
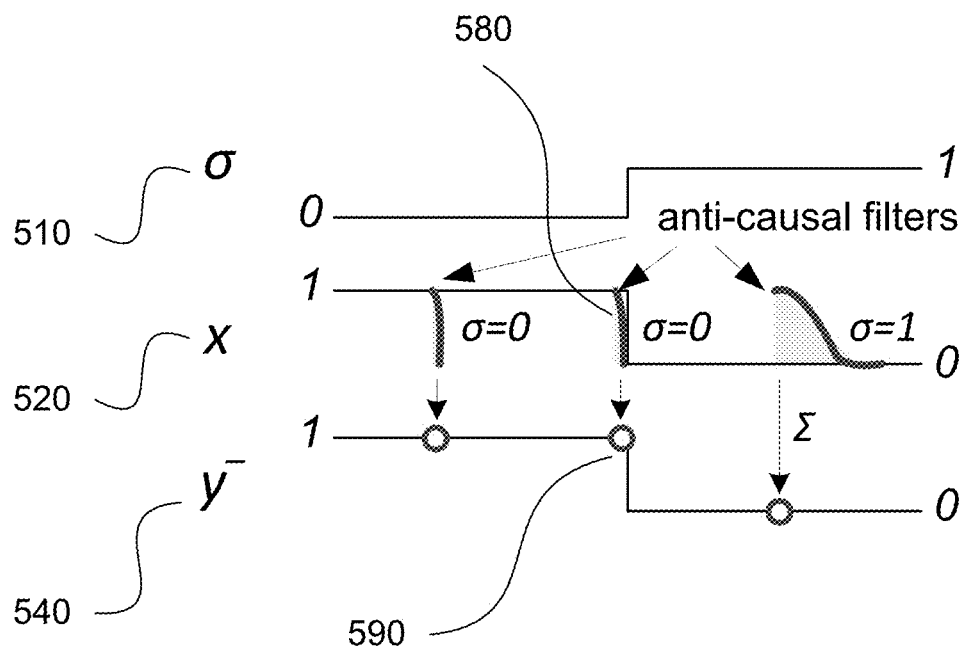
FIG. 5B is a diagram illustrating no intensity leakage caused by a recursive filter in the anti-causal direction at a rising blur discontinuity.

Colour bleeding across blur discontinuities by a two-pass (causal+anti-causal) parallel IIR filter arrangement is now explained with reference to FIGS. 5A and 5B. FIG. 5A shows the forward pass which generates the forward output signal y⁺, 530, and FIG. 5B shows the backward pass which generates the backward output signal y⁻, 540. The overall output is y=y⁺+y⁻. In the filter arrangement of FIGS. 5A and 5B, the input signal x, 520, is a step edge with a collocated blur change, 550, in the blur width σ, 510. Each piecewise flat region in the input corresponds to a different sigma: σ=0 when x=1, and σ=1 when x=0. Because the only change in the input signal x is at the same location as the change in the blur width σ, the overall output y is expected to be unchanged from the input x. During the backward pass in FIG. 5B, where the blur transits from one to zero, the anti-causal output y⁻, 540, is indeed the same as the input x, 520. However, during the forward pass, where the blur transits from zero to one, the causal filter 560 (in bold shape) with σ=1 for pixels next to the edge 550 integrates over a region of mixed intensities on both sides of the edge (shaded region). This causes an intensity leakage or intensity bleeding from the sharp region (σ=0) into the blurry region (σ=1), and the shape of y⁺, 530, changes accordingly around pixel 570. Note that the intensity leakage occurs only in the causal direction when the blur width σ increases abruptly from zero to one (FIG. 5A). Intensity bleeding does not occur in the anti-causal direction when the blur width decreases from one to zero (FIG. 5B). This is because the anti-causal filter 580 has zero blur width close to the step edge, which does not cause any leakage in the output intensity 590.

The intensity leakage at blur discontinuities can be minimised by an asymmetric space-variant recursive filter. Instead of having the same blur width σ for both the causal and anti-causal passes, filters in each direction get a different blur width. For 2D images, where recursive filtering is applied in two directions (forward and backward) and separably in two dimensions (x and y), all four directional sigmas $\sigma_x^+$, $\sigma_x^-$, $\sigma_y^+$, $\sigma_y^-$ can be different. As the sliding filter approaches a blur discontinuity along its path, the blur width can be reduced to minimise intensity leakage across the blur discontinuity (this is done only when σ changes abruptly from a low value to a high value as shown in FIG. 5A).

Constraining the Rate of Increase of the Directional Sigmas by Tapering the Blur Width σ

Figure 6:
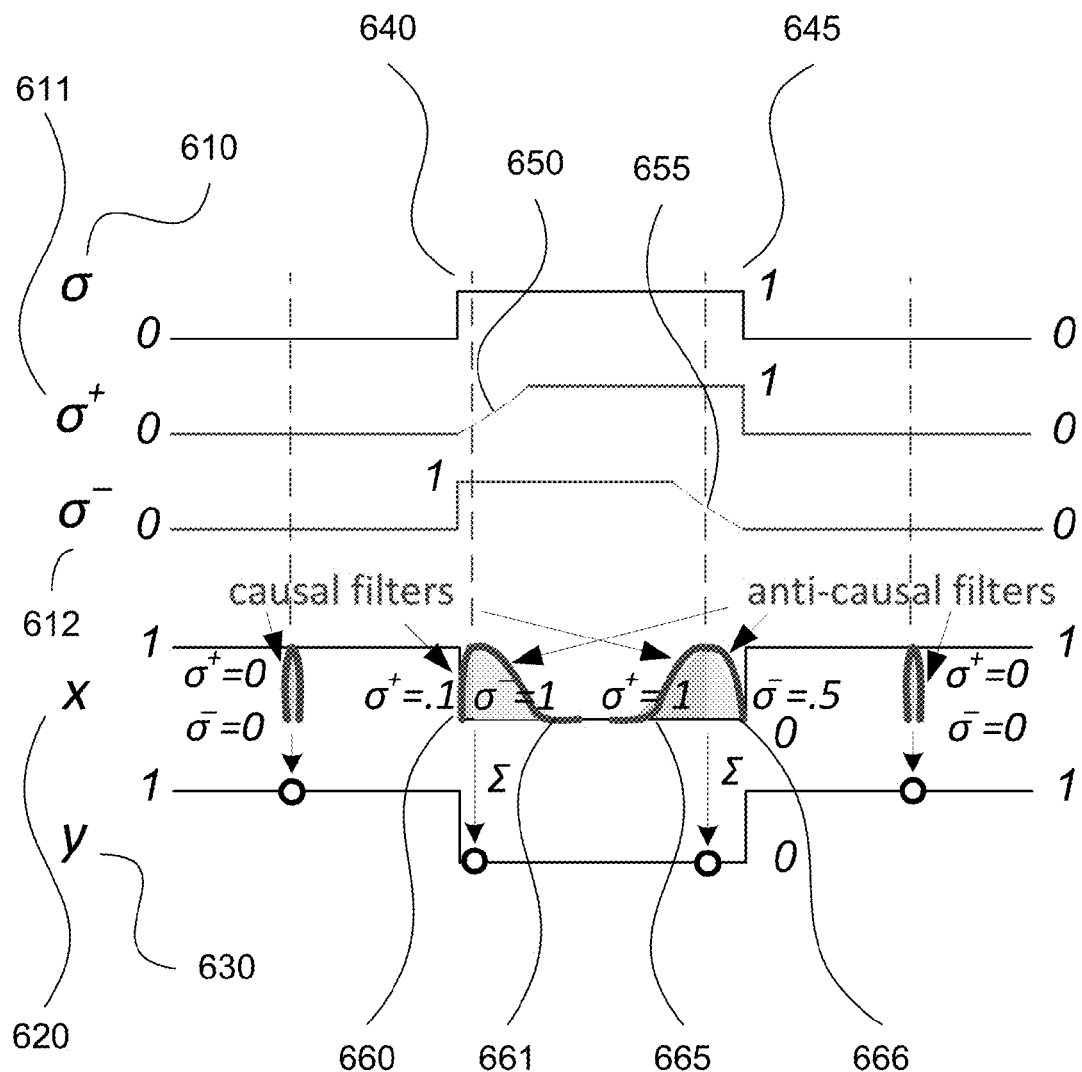
FIG. 6 is a diagram illustrating reduction of intensity leakage caused by a recursive filter by tapering the directional blur kernel widths at rising blur discontinuities in accordance with an embodiment of the present invention.

The idea of constraining the rate of increase of the directional sigmas to minimise intensity leakage across blur discontinuities is illustrated with reference to a 1D input signal x, 620 and an output signal y, 630, in FIG. 6. For the causal direction, intensity leakage occurs when the blur width σ, 610, changes abruptly from low to high at location 640. To minimise this leakage, the rate of increase of the forward blur width σ⁺, 611, from left to right is tapered to at most ⅓ per pixel within region 650. The value of ⅓ was chosen based on the 3-sigma rule of the Gaussian function which states that 99.7% of the area under the function lies within three standard deviations. As illustrated in the fourth row of FIG. 6, the spatial extent of the causal filter 660 just after the step edge 640 is reduced so that the filter support does not extend over the other side of the blur discontinuity. Similarly, intensity leakage occurs along the anti-causal direction when the blur width σ changes abruptly from high to low going from left to right at location 645. To minimise this leakage, the rate of increase of the backward blur width σ⁻, 612, going from right to left is also tapered to at most ⅓ per pixel within region 655. As a result, the spatial extent of the anti-causal filter 666 just before the step edge 645 is reduced so that the filter support does not extend over the other side of the blur discontinuity. Note that the tapering, if it occurs, only occurs for one direction at any location: the direction corresponding to a rising or increasing blur width. The other direction corresponding to a falling or decreasing blur width does not trigger tapering. As a result, the spatial extents of the anti-causal filter 661 and the causal filter 665 are larger than their causal filter 660 and anti-causal filter 666 counterparts at the same locations. The different treatments of the directional sigmas around blur discontinuities lead to asymmetric Gaussian filters. These asymmetric filters avoid smoothing across blur discontinuities.

Asymmetric Filter Construction

Even for symmetric IIR filters, the causal and anti-causal filter impulse responses are not identical. FIG. 7A shows a causal filter response 710, an anti-causal filter response 720 and an overall filter response 730 for a symmetric IIR filter with $\sigma^+ = \sigma^-$. The causal filter response 710 is non-zero at the central tap, whereas the anti-causal filter response 720 is not. This is due to the different input delays in the causal and anti-causal IIR filter in equations (7), (8), (18) and (19). The sum of these one-sided filter responses, however, forms a normalised symmetric Gaussian filter response (730).

FIG. 7B shows a causal filter response 740, an anti-causal filter response 750, and an overall filter response 770 for an asymmetric IIR filter with $\sigma^+ \neq \sigma^-$. Unfortunately, the causal and anti-causal filter responses with different directional blur widths (740 and 750) do not sum up to a normalised filter response. As a result, a weighted identity filter having a response $w\delta$, 760, has to be added to the mix to make the total response of the asymmetric filter equal to one (response 770 in FIG. 7B).

The weighted identity filter can be further decomposed into two parts $w\delta = w^+\delta + w^-\delta$ (850 and 855 in FIG. 8) where $w^+ = -n_0(\sigma^+)/2$ and $w^- = n_0(\sigma^-)/2$ ($n_0$ is the value of the first recursive tap in the forward direction in equations 7 or 18). $n_0(\sigma)/2$ represents half the height of the filter response at the central tap. As a result, subtracting $n_0(\sigma)\delta/2$ from the forward filter response 841 and adding $n_0(\sigma)\delta/2$ to the backward filter response 846 make these one-sided filter responses symmetric about the central tap. Each of the filter responses after this delta correction (860 and 865 in FIG. 8) sums up to 0.5.

Figure 8:
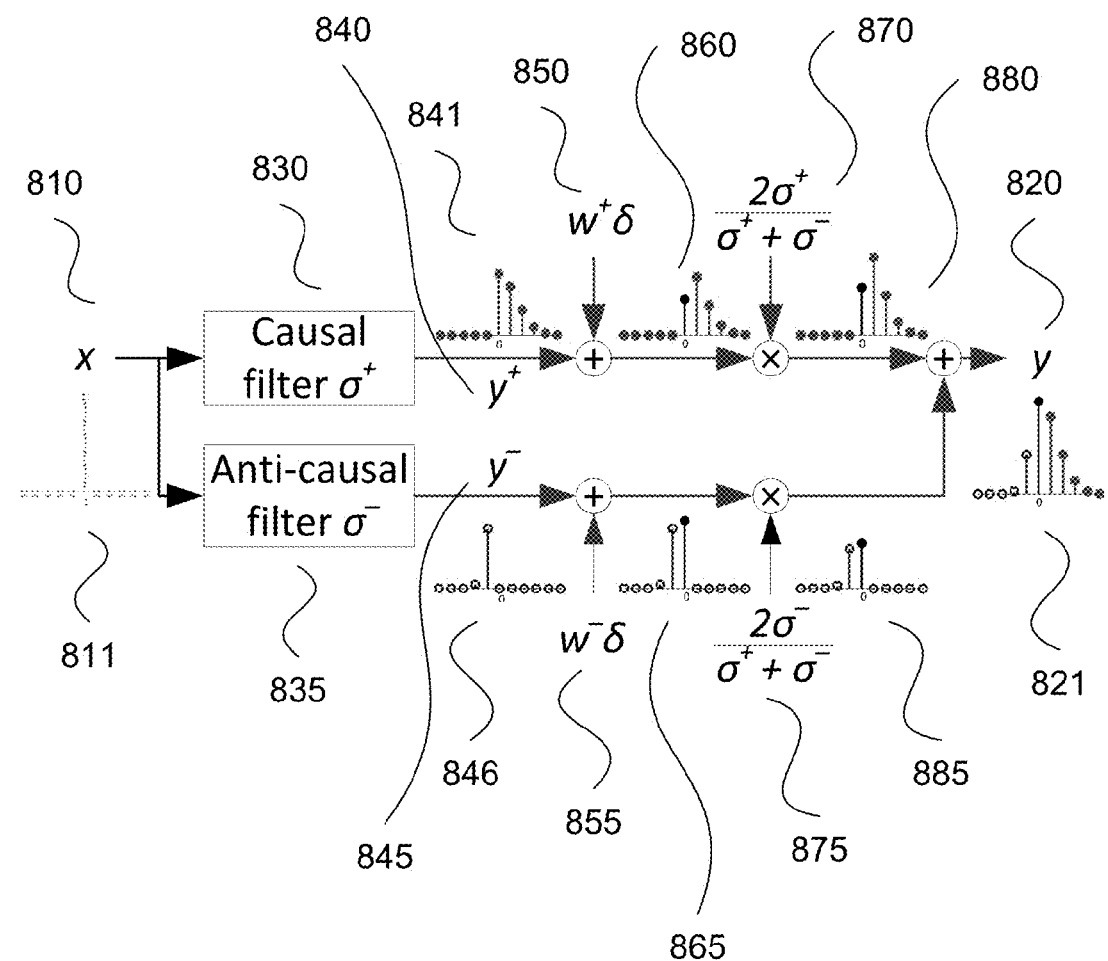
FIG. 8 is a diagram illustrating a method for outputting a correctly normalised filter output by a weighted average of a causal filtered output and an anti-causal filtered output in accordance with an embodiment of the present invention.

The complete signal flow diagram for asymmetric space-variant recursive Gaussian filtering is shown in FIG. 8. The input signal x, 810 is filtered independently by a causal filter 830 and an anti-causal filter 835 to produce intermediate filtered outputs $y^+$, 840, and $y^-$, 845, respectively. After the delta correction steps 850 and 855, the forward and backward filter results at each pixel are combined using a weighted sum (i.e. sum of 880 and 885), where the weights 870 and 875 are proportional to the corresponding directional blur width. Given an impulse input 811, the combined impulse response 821 has an asymmetric Gaussian shape. This weighted combination was found to further reduce halo artefacts around blur discontinuities. However, a negligible amount of halo is still present because IIR filters have infinitely long responses that extend to the other side of the blur discontinuity.

Note that the filter coefficients $n_i$, $m_i$, and $d_i$ for the causal filter 830 and anti-causal filter 835 are space-variant. To avoid recomputing these recursive filter coefficients at each pixel in real-time, their values can be pre-computed, stored and retrieved from a look-up table.

Figure 10:
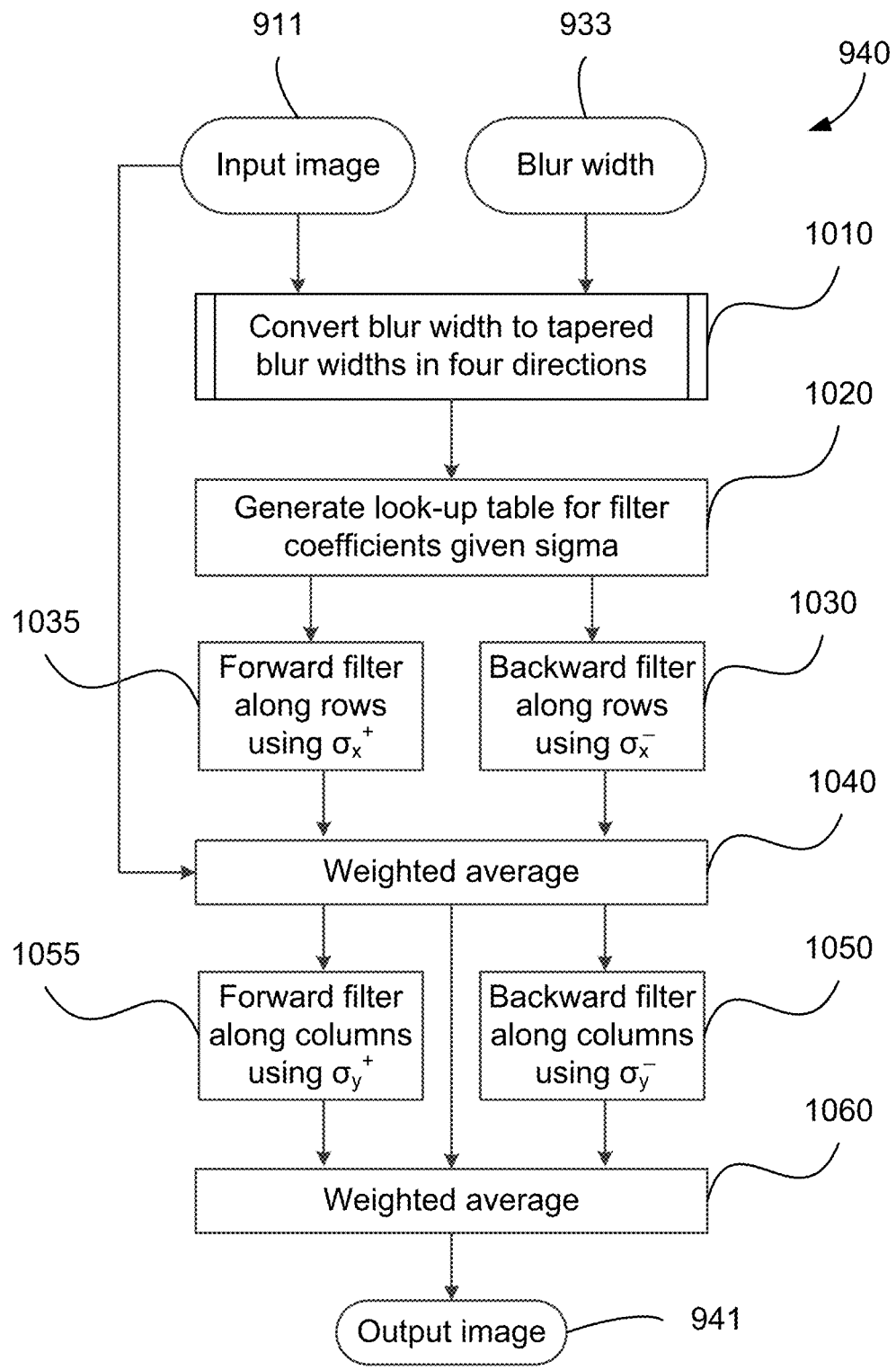
FIG. 10 is a schematic flow diagram illustrating an implementation of a 2D space-variant filter using separable space-variant asymmetric recursive 1D Gaussian filters in accordance with an embodiment of the present invention.

FIG. 10 is a schematic flow diagram that provides additional detail in relation to an exemplary space-variant asymmetric recursive filter that may be practised to perform step 940 of FIG. 9. Referring to step 1010 of FIG. 10, the blur width $\sigma$, 933, is used to create four tapered blur widths in the horizontal forward direction ($\sigma_x^+$), horizontal backward direction ($\sigma_x^-$), vertical forward direction ($\sigma_y^+$), and vertical backward direction ($\sigma_y^-$). Each tapered blur width is modified from the isotropic blur width $\sigma$ to cap or limit the rate of increase along the associated direction to a certain limit (e.g., ⅓ per pixel). Note that the tapering only applies when there is an increase in the blur width $\sigma$. A decrease in the isotropic blur width $\sigma$ does not trigger tapering. This tapering of the directional blur width reduces the colour bleeding of pixels from sharper regions into adjacent pixels in blurrier regions. At a following step 1020, the filter coefficients $n_i$, $m_i$, and $d_i$ (i=1,2 for second-order IIR filter, i=1, 2, 3, 4 for fourth-order IIR filter, etc.) for a range of blur widths $\sigma$ are generated and input to or stored in a look-up table. Causal filtering along image rows is then performed using a forward recursive filter using the forward horizontal blur width $\sigma_x^+$ in step 1035. For efficiency, the filter coefficients can be retrieved from the look-up table in step 1020 given the tapered blur width $\sigma_x^+$. Similarly, anti-causal filtering along image rows is performed using a backward recursive filter using the backward horizontal blur width $\sigma_x^-$ in step 1030. Step 1040 performs a weighted average of the horizontally forward filtered result from step 1035, the horizontally backward filtered result from step 1030 and the input image to form a horizontally filtered image. The corresponding weights are $2\sigma_x^+/(\sigma_x^+ + \sigma_x^-)$, $2\sigma_x^-/(\sigma_x^+ + \sigma_x^-)$, and $(-n_0(\sigma_x^+)\sigma_x^+ + n_0(\sigma_x^-)\sigma_x^-)/(\sigma_x^+ + \sigma_x^-)$ respectively. The horizontally filtered image is then filtered along image columns using the vertical forward filter with blur width $\sigma_y^+$ in step 1055 and using the vertical backward filter with blur width $\sigma_y^-$ in step 1050. Finally, the vertically forward filtered result from step 1055, the vertically backward filtered result from step 1050 and the horizontally filtered image from step 1040 are weighted averaged to form the output image, 941, in step 1060. The corresponding weights are $2\sigma_y^+/(\sigma_y^+ + \sigma_y^-)$, $2\sigma_y^-/(\sigma_y^+ + \sigma_y^-)$, and $(-n_0(\sigma_y^+)\sigma_y^+ + n_0(\sigma_y^-)\sigma_y^-)/(\sigma_y^+ + \sigma_y^-)$, respectively, where $n_0$ is the value of the first filter coefficient in the forward direction in equation 7 or 18. Accordingly, tapered blur width is applied as a filter to output a blurred pixel value using filter coefficients determined based on blur width values of one or more previously blurred pixels. In particular, the blurred pixel values can comprise a weighted average of an initial pixel value of the pixel, and an initial value and a blurred value of a previously blurred pixel on the scan line.

Figure 11:
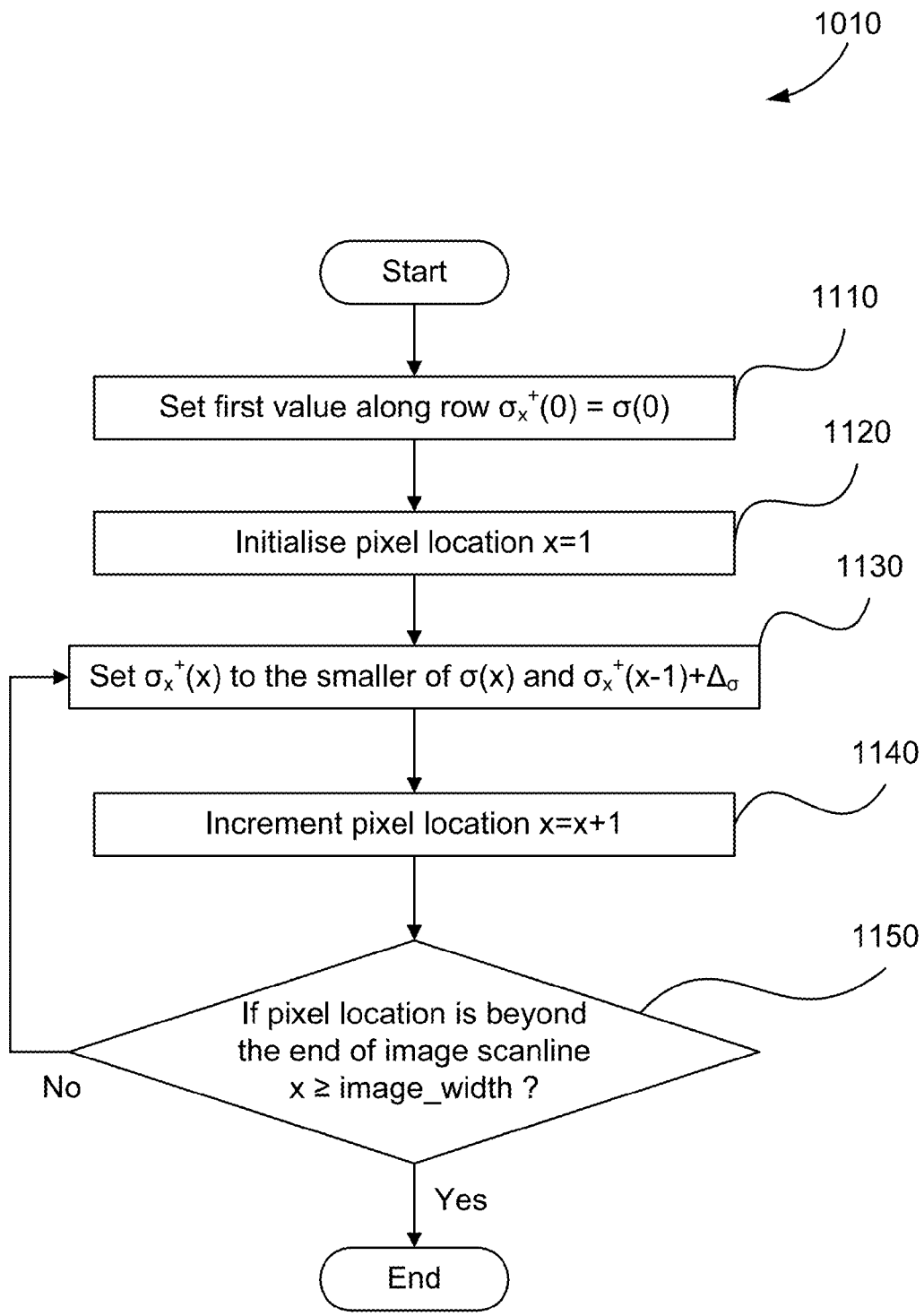
FIG. 11 is a schematic flow diagram illustrating an implementation of tapering a directional blur width based on an input blur kernel width in accordance with an embodiment of the present invention.

An exemplary implementation of the tapering of the rising blur width in step 1010 of FIG. 10 is now described in additional detail with reference to FIG. 11 for the horizontal forward direction. Tapering in other directions can be carried out in a similar fashion. This tapering process is applied to each scan-line of the blur width image a along the corresponding direction. For the horizontal direction, the scan-lines are image rows. For the vertical direction, the scan-lines are image columns. The tapered blur width may be modified from the blur width by adding an intensity-dependent offset. Referring to FIG. 11, the tapering process starts at step 1110, where the first value of the tapered blur width $\sigma_x^+(0)$ is set to equal the first value of the original blur width $\sigma(0)$. For any subsequent pixel location x, starting from x=1 in step 1120, the tapered blur width $\sigma_x^+(x)$ is set to the smaller of the original blur width at the same location $\sigma(x)$ and an incremented value of the tapered blur width at the previous location $\sigma_x^+(x-1)$. The positive incremental value $\Delta_\sigma$ in step 1130 ensures that the rate of increase of the tapered blur width is capped at $\Delta_\sigma$ per pixel. This prevents or substantially reduces colour bleeding due to an excessive extension of a large Gaussian filter kernel into the neighbouring sharp image regions. The value $\Delta_\sigma = ⅓$ was chosen for the Gaussian filter, so that the spatial support effectively cuts off outside $\pm 3\sigma$. As those skilled in the art will appreciate, other values for the incremental value $\Delta_\sigma$ are possible, depending on how quickly the IIR filter response dies off. The incremental value $\Delta_\sigma$ can even be spatially adaptive based on the colour difference between two adjacent pixel locations x−1 and x. For example, if the visual difference between the two adjacent pixels I(x−1) and I(x) is small, the incremental value $\Delta_\sigma$ can be larger than ⅓ since the effects of bleeding will not be catastrophic. On the other hand, if the visual difference between the two adjacent pixels I(x−1) and I(x) is large, the incremental value $\Delta_\sigma$ should be kept small (close to ⅓) to avoid visible colour bleeding. After tapering the blur width at the current pixel location x, the current pixel location x is incremented by one in step 1140 to the next pixel location in the scan-line. Step 1150 determines whether the incremented pixel location is beyond the end of the current scan-line. If it is, the tapering process ends for the current scan-line, otherwise the process loops back to step 1130 to taper the blur width at the incremented pixel location. To avoid colour bleeding beyond adjacent pixels, e.g. bleeding from pixel I(x) to pixel I(x−2), the tapered blur width $\sigma_x^+(x)$ in step 1130 can be set to a minimum of $\sigma(x)$, $\sigma_x^+(x-1)+\Delta_\sigma$, $\sigma_x^+(x-2)+2\Delta_\sigma$, $\sigma_x^+(x-3)+3\Delta_\sigma$, and so on. This may be necessary in case the blur width difference between a sharp foreground and an adjacent bluffed background is significant.

Multi-Layer Extension

Due to the edge-stopping characteristic of the proposed asymmetric space-variant Gaussian filter, if there is a thin in-focus midground object, the background behind will not be blurred across this thin midground layer. The bluffed background may then appear unnatural around the thin midground object because background intensities do not diffuse evenly in these areas. Another special effect that the asymmetric space-variant Gaussian filter cannot produce from a single image is partial occlusion. Partial occlusion occurs at the boundary of the in-focus midground and blurry foreground objects. The blurry foreground objects (especially thin objects) appear semi-transparent and float on top of a sharp midground. To accurately simulate even background blur and partial occlusion effects, a multi-layer approach is required. The image is segmented into either two layers (in-focus foreground and out-of-focus background) or three layers (out-of-focus foreground, in-focus midground and out-of-focus background), and each layer is bluffed separately before the blurred layers are blended to produce a final output image. Differently from most prior art techniques which use a different space-invariant blur for each layer, the proposed space-variant Gaussian filter can be applied to simulate continuous, varying blur even within a single layer. This is especially important for a portrait photograph, in which the subject of focus (e.g., a face) has a variable amount of blur within the subject (e.g., eyes are in perfect focus, whereas nose and ears are slightly out of focus). Space-variant blur also happens frequently in the background layer, where multiple background objects are located at different depths from the camera.

Figure 12:
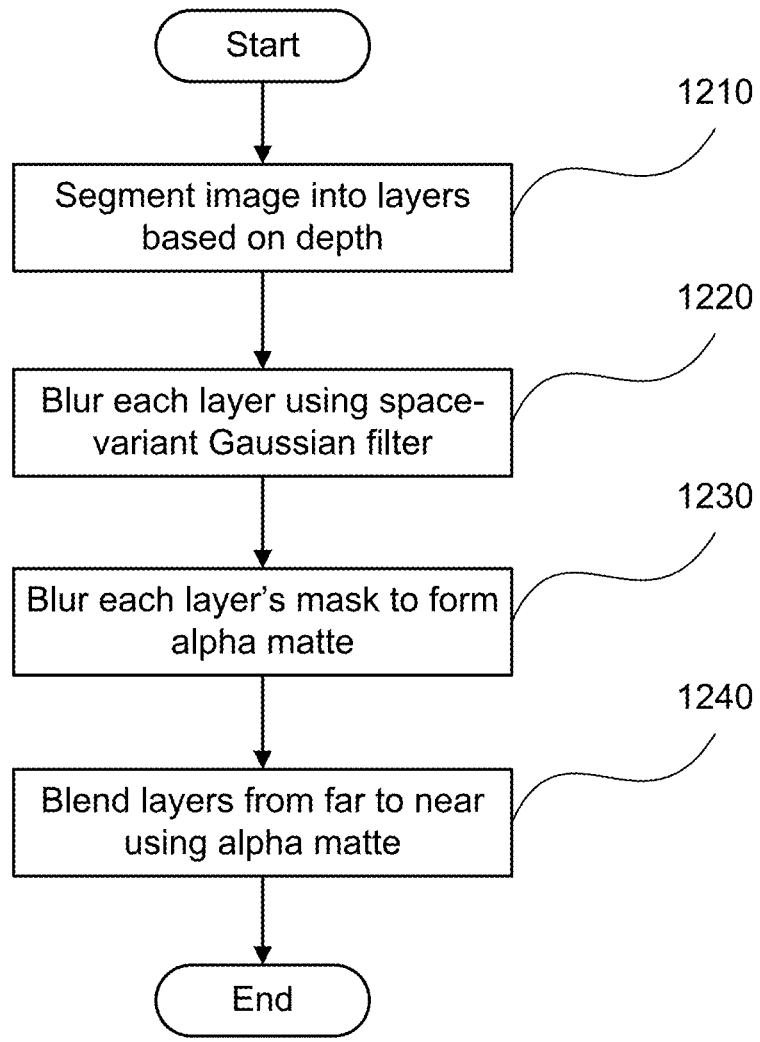
FIG. 12 is a schematic flow diagram illustrating a method of multi-layer bokeh rendering using a space-variant asymmetric recursive Gaussian filter in accordance with an embodiment of the present invention.

FIG. 12 is a flow diagram of a method for multi-layer space-variant bokeh rendering. Referring to FIG. 12, at step 1210, the input image is segmented into a small number of layers (e.g., 2 or 3 layers) based on depth or computed blur width. Ideally, each object should lie on a single layer to avoid artefacts due to blending across different layers. This segmentation also produces a binary segmentation mask associated with each layer. Each layer is then blurred independently using the proposed asymmetric space-variant Gaussian filter in step 1220. The same filter for each layer is applied to the associated mask to form an alpha matte for each layer at step 1230. The filtered layers are blended or combined from far to near in step 1240 using the computed alpha mattes. Given three layers, for example, the background layer is blended with the midground layer first, the result of which is blended with the foreground layer. This depth-ordered blend is similar to the so-called Z-buffer technique in computer graphics, where the closest objects to the camera are rendered last to ensure their visibility over occluded objects in the background. With this layer approach, the occluded regions for each layer may need to be inpainted to simulate the colour and texture of the hidden pixels. Inpainting also avoids the hidden pixels being set to black, which introduces a fall-off of intensity affecting a region the size of the blur kernel radius on either side of a segmented boundary.

Tone-Mapped Extension

The use of Gaussian filters as described herein leads to a Gaussian-like bokeh shape. A Gaussian Point Source Function (PSF) may be seen as too smooth compared to a blur disc PSF from a circular aperture camera with a large aperture lens. This is especially noticeable for night scenes, where point light sources show up as weak, diffused blobs for a Gaussian PSF instead of bright circles for a disc-shaped PSF. The blur-disc effect is visible even in daylight shots, where specular highlights captured using a large aperture lens can appear with more vivid circular bokeh than a Gaussian PSF produces. Although it is difficult to engineer an IIR filter with sharp fall-off like the blur disc, the Gaussian IIR filter can exhibit a parabolic blur shape if applied to an exponentially mapped image. The filtered result is then mapped back to the displayable dynamic range via a logarithmic operation. Around the vicinity of a specular highlights, for example, the intensity will have a Gaussian PSF $\exp(-I^2/2\sigma^2)$, where I is the exponentially mapped intensity of the highlight. After the logarithmic mapping, the PSF shape becomes $\log(\exp(-I^2/2\sigma^2))=-I^2/2\sigma^2$, which has an inverted parabola shape. An inverted parabola decays more slowly around the vicinity of the specular highlight than a Gaussian PSF. As a result, the inverted parabola bokeh looks more like a blur disc PSF.

In fact, most visible images are tone-mapped before display to reduce the high dynamic range of the raw linear CCD/CMOS response to a displayable 8-bit or 16-bit dynamic range. Due to the more aggressive compression of the dynamic range at high raw intensity values, most forward tone mapping functions look like a logarithmic function. As a result, the exponential mapping can be seen as an inverse tone mapping to convert the displayable image to its linear camera response. If the camera tone map information is available, the true inverse tone map should be used for filtering instead of the exponential tone map.

Large Step-Size Anisotropic Diffusion Extension

Figure 13:
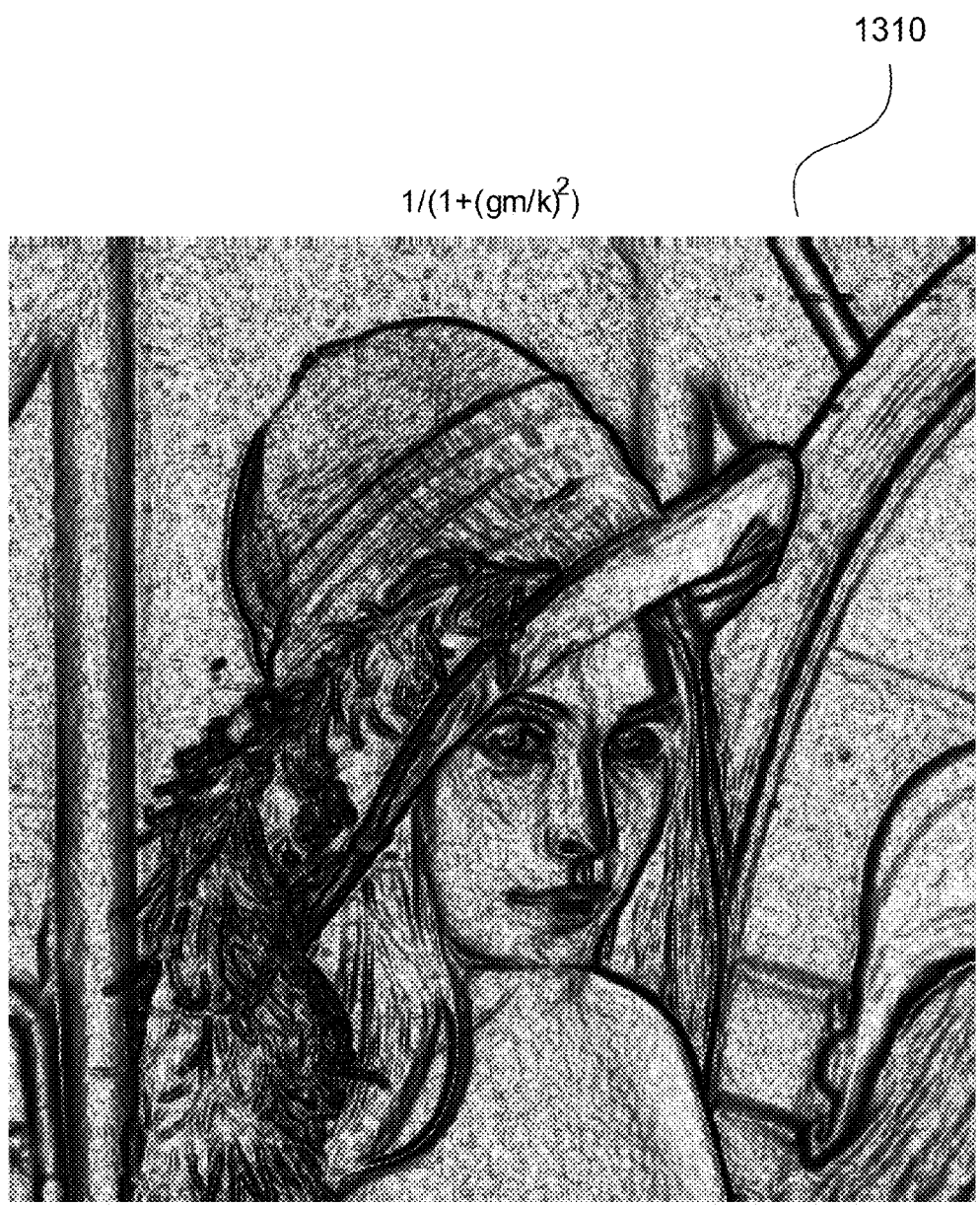
FIG. 13 illustrates in pictorial form an example of a space-variant blur width computed from the gradient magnitude of a 2D portrait image.

A known method for bokeh rendering uses anisotropic diffusion to perform space-variant edge-stopping blur. Diffusion-based approaches produce good edge-stopping bokeh but they have the significant disadvantage of slow speed due to their iterative nature. The proposed asymmetric recursive Gaussian filter can advantageously be used as a large-step speedup of anisotropic diffusion. The diffusivity parameter in anisotropic diffusion is $c=g(\|\nabla I\|)$, where g is a function mapping $[0 +\infty)$ input values to $[1\ 0]$ output values such as $g(x)=1/(1+(x/k)^2)$. This diffusivity parameter can be used to directly control the blur width of the space-variant Gaussian filter. In the function mapping, k is a pre-determined constant, for example, $k=\text{median}(\|\nabla I\|)$ is the median of the gradient magnitude of the image. An example of the space-variant diffusivity c, 1310, for a portrait image is shown in FIG. 13. Referring to FIG. 13, the diffusivity is small (dark intensity) around edges in the scene, and large (bright intensity) in homogeneous image areas. By setting the blur width to a linear multiplication of this diffusivity (e.g. $\sigma=10c$), the result of the asymmetric recursive Gaussian filter will closely resemble the filtered result of anisotropic diffusion. The gradient measure $\|\nabla I\|$ can be computed from the input image itself or it can be computed from a guide image. Typically, the guide image is in good alignment with the input image to allow preserving the same edges in both images. The guide image could be in a different modality compared to the input image. For example, the input image and the guide image could be a non-flash/flash image pair, or a visible/infrared image pair.

One potential drawback of approximating anisotropic diffusion by a single iteration of separable Gaussian filtering in the X-direction followed by a single iteration of separable Gaussian filtering in the Y-direction is directional dependent artefacts for large blur width. Different orders of filtering (X followed by Y or Y followed by X) result in slightly different outputs. The discrepancy due to filtering order is more pronounced for larger blur width. In order to reduce these directional dependent artefacts, the desired blur can be implemented with multiple passes of X- followed by Y-filtering. Usually, 2 iterations of separable filtering are enough to reduce these artefacts to a negligible level. A 2D Gaussian filter with blur width $\sigma$ can be implemented with two applications of a separable Gaussian filter with blur width $\sigma/\sqrt{2}$.

As described with reference to FIGS. 4A and 4B, the bokeh rendering methods or processes described hereinbefore may be practised using a general purpose computer system. For example, a digital camera may be used to capture an image of a scene and a depth map of the same scene. The image and the depth map are transferred to the general purpose computer system, where the steps of the bokeh rendering methods or processes described hereinbefore are carried out by the at least one processing unit or processor, thus producing an output bokeh image which is stored in memory unit for later display, retrieval, and/or rendering.

In a further bokeh rendering embodiment or arrangement, the processing steps are carried out on the camera processing hardware, thus producing an output bokeh image which is stored in the camera memory or a removable memory device for later display, retrieval and/or rendering.

In a further bokeh rendering embodiment or arrangement, the camera transfers the image and the depth map to a cloud computing server via a wired network connection or wireless network connection. The processing steps are carried out by one or more processing units or processors in the cloud computing system, thus producing an output bokeh image which is stored on the cloud server for later retrieval or download, either to the camera or to a general purpose computer.

INDUSTRIAL APPLICABILITY

The embodiments and arrangements described hereinbefore are applicable to the computer and data processing industries and particularly for the image processing.

The foregoing describes only a small number of embodiments of the present invention, and modifications and/or changes can be made thereto without departing from the scope and spirit of the invention, the embodiments being illustrative and not restrictive.

I claim:

1. A method of blurring an image using a spatially variable blur, said method comprising the steps of:
for each pixel of a scan line of pixels in the image:
obtaining a measure representative of image depth at the pixel;
determining a blur kernel width for the pixel based on said measure representative of image depth at the pixel; and
where an increase in the determined blur kernel width with respect to a blur kernel width of a previous pixel in the scan line is detected:
determining, from the determined blur kernel width, a tapered blur width adapted to provide an asymmetric filter response for the pixel; and
applying the tapered blur width to a filter to output a blurred pixel value for the pixel by using a plurality of filter coefficients determined based on blur width value of one or more previously blurred pixels.

2. A method according to claim 1, wherein said blurred pixel value comprises a weighted average of an initial pixel value of the pixel, and an initial value and a blurred value of a previously blurred pixel on the scan line.

3. A method according to claim 1, wherein the tapered blur width is modified from the blur kernel width to limit the rate of increase of the tapered blur width to a maximum of one third per pixel.

4. A method according to claim 1, wherein the tapered blur width is modified from the blur kernel width by adding an intensity-dependent offset.

5. A method according to claim 1, wherein the tapered blur width at a current pixel on the scan line is determined recursively based on the tapered blur width at a previous pixel on the scan line and the blur kernel width at the current pixel.

6. A method according to claim 1, wherein the plurality of filter coefficients is retrieved from a look-up table for each value of the associated tapered blur width.

7. A method according to claim 1, wherein the spatially variable blur is applied separably along a horizontal scan line followed by a vertical scan line.

8. A method according to claim 1, wherein the spatially variable blur is applied separably along a vertical scan line followed by a horizontal scan line.

9. A method according to claim 1, wherein the spatially variable blur is applied on an inverse tone-mapped image, the result of which is tone-mapped back using a forward tone mapping.

10. A method according to claim 1, wherein the spatially variable blur is applied on different segmentation layers of an input image, the results of which are blended together to form an output image.

11. A method according to claim 1, wherein said measure representative of image depth comprises a gradient measure at the pixel.

12. A computer system for blurring an image using a spatially variable blur, said computer system comprising:
a memory unit for storing data and instructions; and
at least one processing unit coupled to said memory unit, said at least one processing unit programmed to:
for each pixel of a scan line of pixels in the image:
obtain a measure representative of image depth at the pixel;
determine a blur kernel width for the pixel based on said measure representative of image depth at the pixel; and
where an increase in the determined blur kernel width with respect to a blur kernel width of a previous pixel in the scan line is detected:
determine, from the determined blur kernel width, a tapered blur width adapted to provide an asymmetric filter response for the pixel; and apply the tapered blur width to a filter to output a blurred pixel value for the pixel by using a plurality of filter coefficients determined based on blur width value of one or more previously blurred pixels.

13. The computer system of claim 12, wherein said blurred pixel value comprises a weighted average of an initial pixel value of the pixel, and an initial value and a blurred value of a previously blurred pixel on the scan line.

14. The computer system of claim 12, wherein the tapered blur width is modified from the blur kernel width to limit the rate of increase of the tapered blur width to a maximum of one third per pixel.

15. The computer system of claim 12, wherein the tapered blur width is modified from the blur kernel width by adding an intensity-dependent offset.

16. A non-transitory computer readable storage medium having a computer program stored thereon for blurring an image using a spatially variable blur, said computer program comprising code for processing scan lines of pixels in the image and for each pixel in a scan line:
   obtaining a measure representative of image depth at the pixel;
   determining a blur kernel width for the pixel based on said measure representative of image depth at the pixel; and
   where an increase in the determined blur kernel width with respect to a blur kernel width of a previous pixel in the scan line is detected:
      determining, from the determined blur kernel width, a tapered blur width adapted to provide an asymmetric filter response for the pixel; and
      applying the tapered blur width to a filter to output a blurred pixel value for the pixel by using a plurality of filter coefficients determined based on blur width value of one or more previously blurred pixels.

17. The non-transitory computer readable storage medium of claim 16, wherein said blurred pixel value comprises a weighted average of an initial pixel value of the pixel, and an initial value and a blurred value of a previously blurred pixel on the scan line.

18. The non-transitory computer readable storage medium of claim 16, wherein the tapered blur width is one of:
   (i) modified from the blur kernel width to limit the rate of increase of the tapered blur width to a maximum of one third per pixel;
   (ii) modified from the blur kernel width by adding an intensity-dependent offset; and
   (iii) determined, at a current pixel on the scan line, recursively based on the tapered blur width at a previous pixel on the scan line and the blur kernel width at the current pixel.

19. The non-transitory computer readable storage medium of claim 16, wherein the plurality of filter coefficients is retrieved from a look-up table for each value of the associated tapered blur width.

20. The non-transitory computer readable storage medium of claim 16, wherein the spatially variable blur is applied by one of:
   (i) separably along a horizontal scan line followed by a vertical scan line;
   (ii) separably along a vertical scan line followed by a horizontal scan line;
   (iii) on an inverse tone-mapped image, the result of which is tone-mapped back using a forward tone mapping; and
   (iv) on different segmentation layers of an input image, the results of which are blended together to form an output image.

\* \* \* \* \*